United States Patent
Hyun et al.

(10) Patent No.: US 10,299,645 B2
(45) Date of Patent: May 28, 2019

(54) VACUUM CLEANER

(71) Applicant: LG ELECTRONICS INC., Seoul (KR)

(72) Inventors: Kietak Hyun, Seoul (KR); Jungmin Ko, Seoul (KR); Soohan Eo, Seoul (KR); Sangchul Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 127 days.

(21) Appl. No.: 15/583,110

(22) Filed: May 1, 2017

(65) Prior Publication Data

US 2017/0319027 A1    Nov. 9, 2017

(30) Foreign Application Priority Data

May 3, 2016   (KR) .................. 10-2016-0054853
Aug. 22, 2016  (KR) .................. 10-2016-0106292

(51) Int. Cl.
*B01D 45/12* (2006.01)
*B01D 50/00* (2006.01)
(Continued)

(52) U.S. Cl.
CPC .............. *A47L 9/1608* (2013.01); *A47L 5/362* (2013.01); *A47L 9/108* (2013.01); *A47L 9/165* (2013.01); *A47L 9/1633* (2013.01); *A47L 9/1641* (2013.01); *A47L 9/1666* (2013.01); *A47L 9/1683* (2013.01); *B01D 46/24* (2013.01); *B01D 45/16* (2013.01); *B01D 46/2403* (2013.01);
(Continued)

(58) Field of Classification Search
CPC ........ B01D 45/12; B01D 45/16; B01D 50/00; B01D 50/002
USPC ...... 55/429, 459.1, 430, 457, 345, 346, 424, 55/426, DIG. 3
See application file for complete search history.

(56) References Cited

U.S. PATENT DOCUMENTS 7,771,499 B2   8/2010  Oh et al.
7,857,878 B2  12/2010  Park et al.
(Continued)

FOREIGN PATENT DOCUMENTS

CN   203861141 U  * 10/2014  ............... A47L 9/16
EP   2 063 699      11/2010
(Continued)

OTHER PUBLICATIONS

Korean Office Action dated Jul. 19, 2017 issued in Application No. KR 10-2016-0054855.
(Continued)

*Primary Examiner* — Robert A Hopkins
(74) *Attorney, Agent, or Firm* — Ked & Associates, LLP

(57) ABSTRACT

A vacuum cleaner, including a cleaner body; and a dust collector provided in the cleaner body, wherein the dust collector includes a first cyclone provided within an outer case to filter foreign matter and dust from air introduced into the dust collector; a second cyclone accommodated within the first cyclone to separate fine dust from the air introduced into the first cyclone; a screw provided at a lower side of and surrounding the first cyclone, and having at least one vane spirally extended along a flow direction of the air introduced into the outer case to induce the inflow of foreign matter and dust filtered by the first cyclone into a first storage section.

21 Claims, 16 Drawing Sheets

(51) Int. Cl.
*A47L 9/16* (2006.01)
*A47L 5/36* (2006.01)
*B01D 46/24* (2006.01)
*A47L 9/10* (2006.01)
*B01D 45/16* (2006.01)

(52) U.S. Cl.
CPC ........ *B01D 50/002* (2013.01); *B01D 2279/55* (2013.01)

(56) References Cited

U.S. PATENT DOCUMENTS

| | | | |
|---|---|---|---|
| 8,272,854 | B2 | 9/2012 | Castronovo |
| 8,657,904 | B2 * | 2/2014 | Smith ................ A47L 5/24 55/343 |
| 9,089,248 | B2 | 7/2015 | Yoo |
| 2005/0251951 | A1 | 11/2005 | Oh et al. |
| 2006/0107629 | A1 | 5/2006 | Oh |
| 2006/0278081 | A1 | 12/2006 | Han et al. |
| 2007/0095030 | A1 | 5/2007 | Oh |
| 2008/0155947 | A1 | 7/2008 | Oh et al. |
| 2009/0172913 | A1 | 7/2009 | Hyun et al. |
| 2012/0047682 | A1 | 3/2012 | Makarov et al. |
| 2014/0366311 | A1 | 12/2014 | Han et al. |
| 2016/0088988 | A1 | 3/2016 | Eo et al. |

FOREIGN PATENT DOCUMENTS

| | | |
|---|---|---|
| EP | 2 030 543 | 10/2011 |
| JP | H06-102061 | 12/1994 |
| JP | 2009-148345 | 7/2009 |
| JP | 2010-035771 | 2/2010 |
| JP | 2010-094438 | 4/2010 |
| JP | 2013-022252 | 2/2013 |
| JP | 2013-027552 | 2/2013 |
| JP | 2013-039149 | 2/2013 |
| JP | 2013-536736 | 9/2013 |
| KR | 10-2003-0081443 | 10/2003 |
| KR | 10-2004-0023417 | 3/2004 |
| KR | 10-2006-0098765 | 9/2006 |
| KR | 10-2006-0112420 | 11/2006 |
| KR | 10-2006-0118801 | 11/2006 |
| KR | 10-0648960 | 11/2006 |
| KR | 10-2008-0061102 | 7/2008 |
| KR | 10-0842965 | 7/2008 |
| KR | 10-2009-0051346 | 5/2009 |
| KR | 10-2014-0009551 | 1/2014 |
| KR | 10-2016-0038570 | 4/2016 |

OTHER PUBLICATIONS

PCT International Search Report dated Jul. 27, 2017 issued in Application No. PCT/KR2017/004659.
Korean Office Action dated Jul. 18, 2017 issued in Application No. 10-2016-0054854.
International Search Report dated Aug. 2, 2017 issued in Application No. PCT/KR2017/004658.
Taiwanese Notice of Allowance (with English translation) dated Nov. 12, 2018 issued in TW Application No. 106114542.
U.S. Notice of Allowance dated Jan. 29, 2019 issued in U.S. Appl. No. 15/583,478.
PCT International Search Report dated Jul. 25, 2017 issued in Application No, PCT/KR2017/004660.
PCT International Search Report dated Jul. 25, 2017 issued in Application No. PCT/KR2017/004664.
PCT International Search Report dated Jul. 25, 2017 issued in Application No. PCT/KR2017/004669.
U.S. Appl. No. 15/583,269 filed May 1, 2017.
U.S. Appl. No. 15/583,309 filed May 1, 2017.
U.S. Appl. No. 15/583,394 filed May 1, 2017.
U.S. Appl. No. 15/583,471 filed May 1, 2017.
U.S. Appl. No. 15/583,478 filed May 1, 2017.

* cited by examiner (a)

(b)

VACUUM CLEANER

CROSS-REFERENCE TO RELATED APPLICATIONS

This application claims priority under 35 U.S.C. § 119 to Korean Application No. 10-2016-0054853, filed on May 3, 2016, and Korean Application No. 10-2016-0106292, filed on Aug. 22, 2016, whose entire disclosures are hereby incorporated by reference.

BACKGROUND

1. Field

The present disclosure relates to a vacuum cleaner configured to collect foreign matter, dust and fine dust in a separate manner through a multi-cyclone.

2. Background

A vacuum cleaner uses suction power to filter and collect foreign matter, e.g., debris, dust, fine dust, ultra fine dust and the like contained in the sucked air. The types of vacuum cleaners may be divided into i) a canister type, ii) an upright type, iii) a hand type, iv) a cylindrical floor type, and the like.

The canister type vacuum cleaner includes a suction head and a cleaner body separated from each other. An upright type vacuum cleaner may have a structure in which a suction head is integrally formed into a cleaner body. A vacuum cleaner disclosed in Korean Patent Laid-Open Publication No. 10-2003-0081443 (published on Oct. 17, 2003), includes a multi-cyclone structure, each cyclone is vertically provided, which increases the height of a dust collector. The dust collector may be designed to have a slim profile to solve such a height increase issue, but the slim profile causes reduction in the volume of a space for collecting dust.

In order to solve the foregoing problem, a second cyclone is disclosed in Korean Patent Laid-Open Publication No. 10-2004-0023417 (published on Mar. 18, 2004), which is provided within a first cyclone. However, it is difficult to efficiently place the second cyclone within the first cyclone due to interference between the guide passages provided in each second cyclone. Even when the second cyclone is provided within the first cyclone, the number of second cyclones may significantly decrease to reduce suction power, thereby resulting in the deterioration of cleaning performance.

In addition, a variety of flows including a high-speed rotation flow due to the suction power of a fan module are mixed within a dust collector. Such a complicated flow may be an obstacle to collect foreign matter in a first storage section, and causes a problem in which dust collected in the first storage section may be floating and flow back in an upward direction.

Korean Patent Laid-Open Publication No. 10-2004-0023417 (published on Mar. 18, 2004), discloses a solution to prevent the scattering of foreign matter stored in the first storage section below the first cyclone. Further, Korean Patent Laid-Open Publication No. 10-2014-0009551 (published on Jan. 22, 2014), discloses additional cyclone structures. The above references are incorporated by reference herein where appropriate for appropriate teachings of additional or alternative details, features and/or technical background.

BRIEF DESCRIPTION OF THE DRAWINGS

The embodiments will be described in detail with reference to the following drawings in which like reference numerals refer to like elements wherein.

In the drawings.

DETAILED DESCRIPTION

Figure 1:
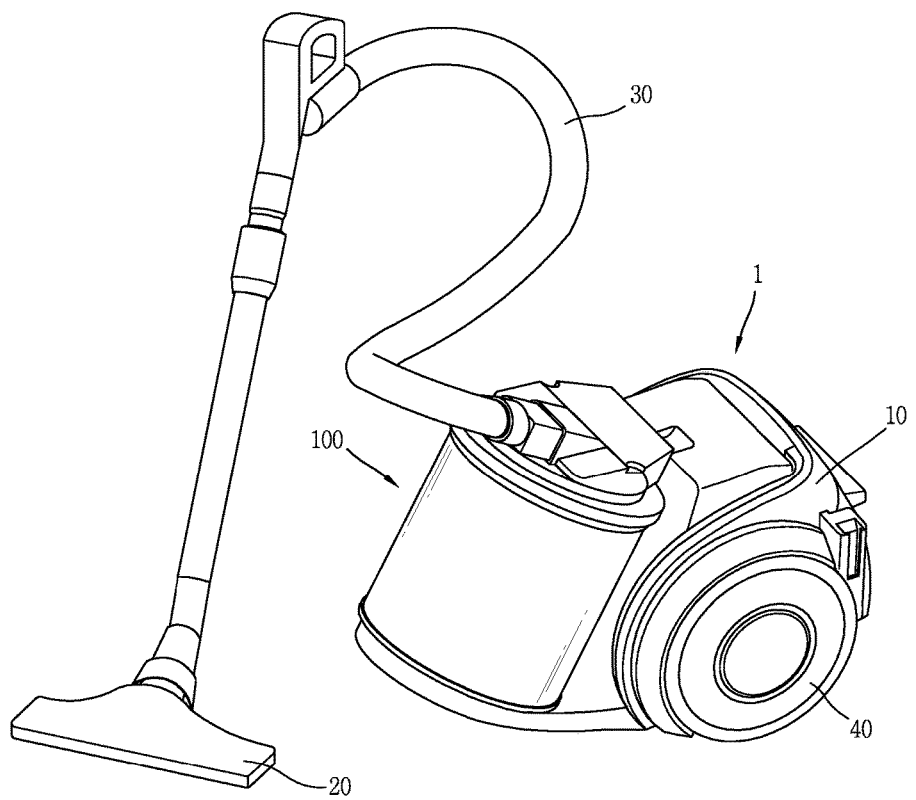
FIG. 1 is a perspective view illustrating an example of a vacuum cleaner according to an embodiment.

Referring to FIG. 1, a vacuum cleaner 1 may include a cleaner body 10, a suction unit or head 20, a connection unit or tube 30, a wheel unit (or wheels) 40, and a dust collector 100. The cleaner body 10 may have a fan module that generates suction power. The fan module may include a suction motor and a suction fan rotated by the suction motor to generate suction power.

The suction unit 20 may suck air below or adjacent to the suction unit 20. The air sucked by the suction unit 20 may contain foreign matter. The connection unit 30 may be connected to the suction unit 20 and the dust collector 100, respectively, to transfer air containing foreign matter sucked through the suction unit 20 to the dust collector 100. The connection unit 30 may be a flexible hose or pipe.

The wheel unit 40 may be rotatably coupled to the cleaner body 10 to move or rotate the cleaner body 10. For example, the wheel unit 40 may include main wheels and auxiliary wheels. The main wheels may be respectively provided at both sides of the cleaner body 10, and the auxiliary wheels may support the cleaner body 10 together with the main wheels and assist the movement of the cleaner body 10 by the main wheels.

The dust collector 100 may be detachably coupled to the cleaner body 10. The dust collector 100 may separate foreign matter from the sucked air, collect the separated foreign matter and discharge the filtered air.

A vacuum cleaner in the related art has a structure in which a connection unit is connected to a suction unit formed in the cleaner body, and the sucked air is introduced into a dust collector through a flow guide extended from the suction unit to the dust collector. The sucked air is introduced into the dust collector 100 by the suction power of the fan module, but there is a problem that suction power decreases as the such air passes through the flow guide of the cleaner body.

On the contrary, the vacuum cleaner 1 of the present embodiment may be directly connected to the dust collector 100 as illustrated in the drawing. According to such a connection structure, air sucked through the suction unit 20 may be introduced directly into the dust collector 100, and thus suction power may be enhanced as compared to related art. Furthermore, there may be an advantage that the formation of a flow guide within the cleaner body 10 is not required.

For reference, the dust collector 100 applied to a canister type vacuum cleaner 1 is illustrated in the present drawing, but the dust collector 100 of the present disclosure may not be necessarily limited to the canister type vacuum cleaner 1. The dust collector 100 may be also applicable to various vacuum cleaners such as an upright type vacuum cleaner and a robot cleaner.

Figure 2:
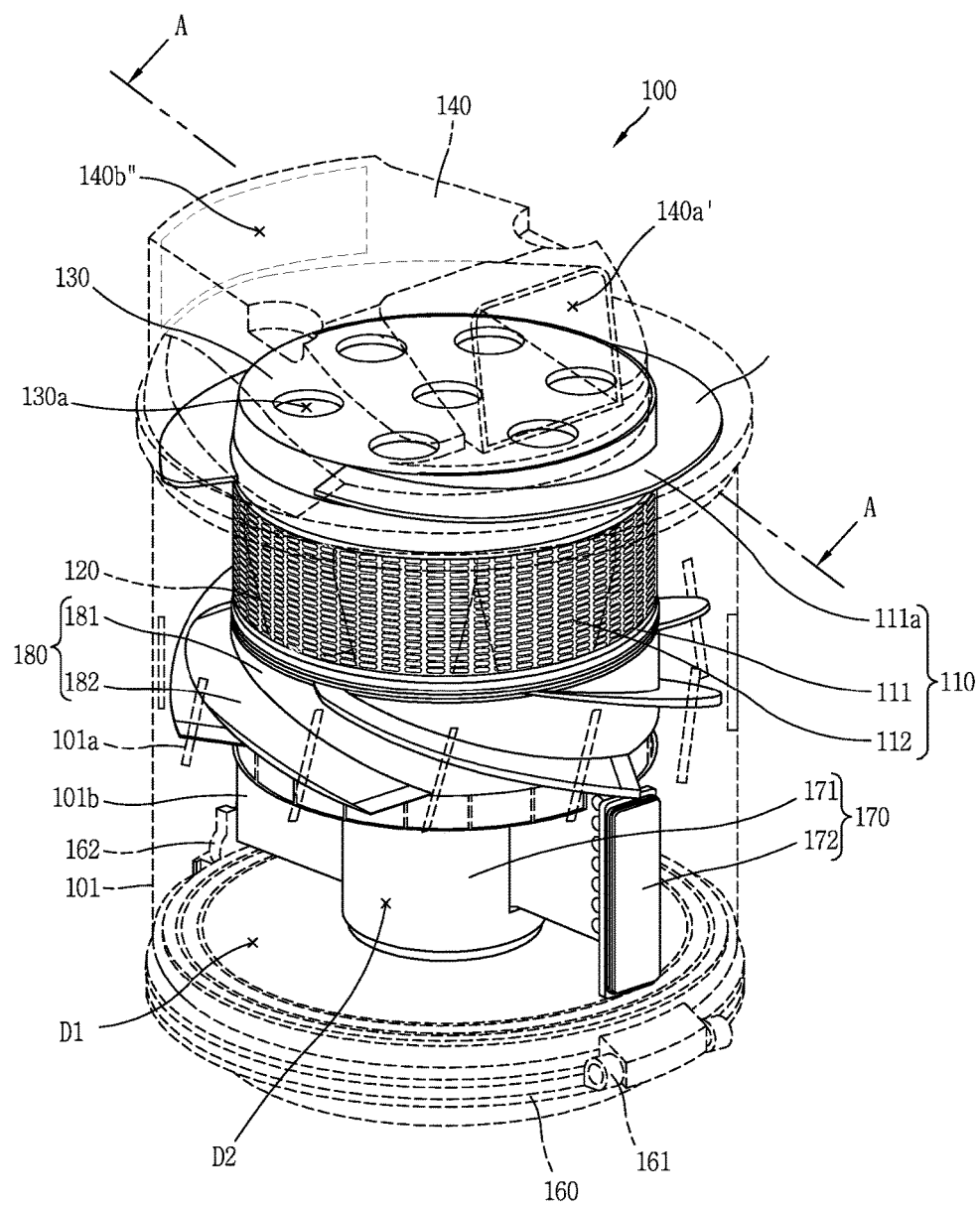
FIG. 2 is a perspective view illustrating an example of a dust collector illustrated in FIG. 1.
Figure 3:
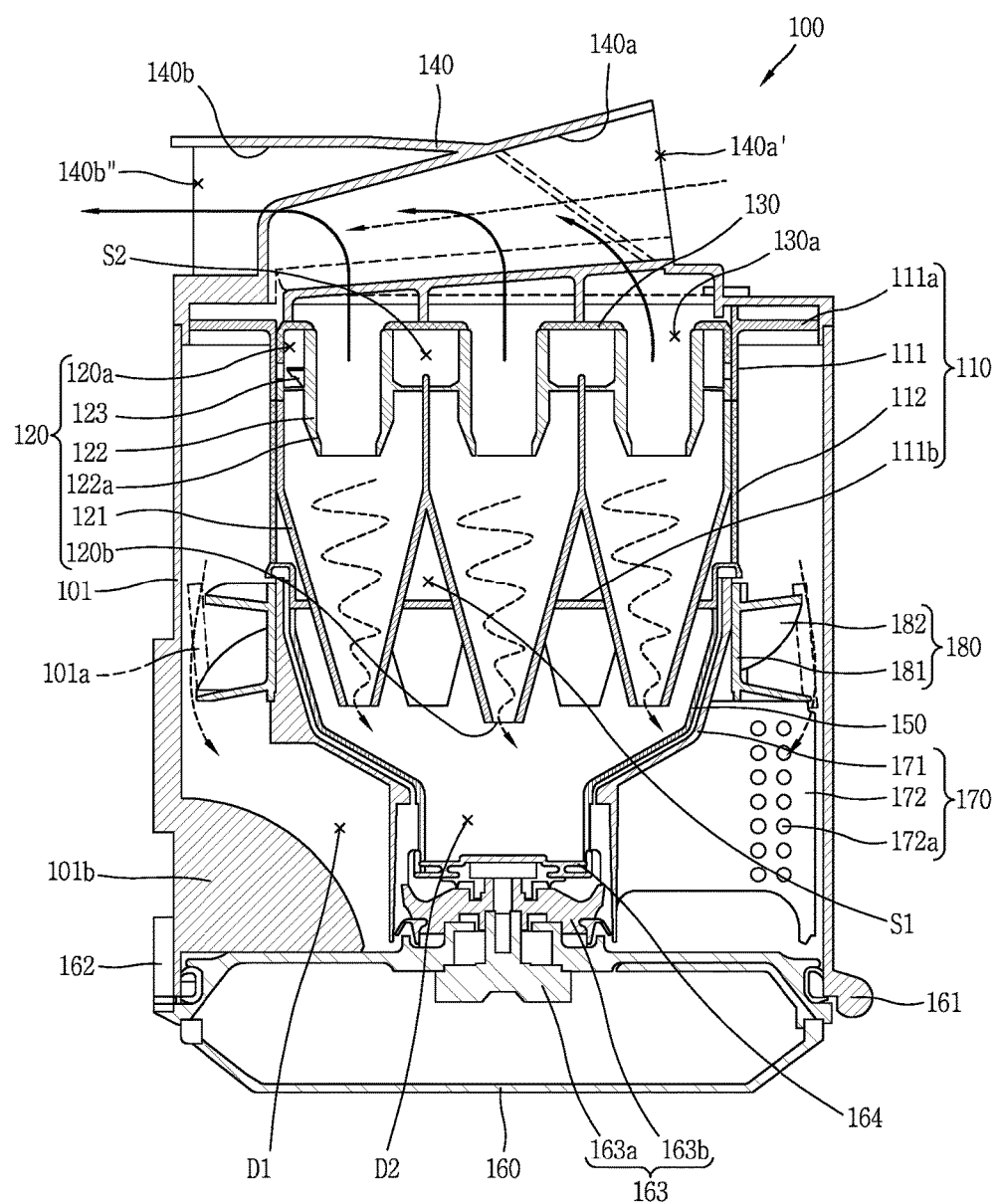
FIG. 3 is a cross-sectional view in which the dust collector illustrated in FIG. 2 is taken along line A-A.

Hereinafter, various examples of the dust collector 100 having a new structure will be described around an overall configuration of the dust collector 100 and a flow in the dust collector 100. Referring to FIGS. 2 and 3, external air sucked by suction power generated from the fan module of the vacuum cleaner 1 may be introduced into the dust collector 100 through an inlet 140a' of the dust collector 100. The air introduced into the dust collector 100 may be sequentially filtered in a first cyclone 110 and a second cyclone 120 and discharged to an outside of the dust collector 100 through an outlet 140b". Foreign matter, dust, and fine dust separated from air by the first and second cyclones 110, 120 may be collected in the dust collector 100.

A cyclone may produce a vortex in air in which particles are floating to separate the particles from the air by a centrifugal force. The cyclone may separate foreign matter, dust, and fine dust from the air introduced into the cleaner body 10 by suction power. In the present specification, a relatively large dust is referred to as a "dust", a relatively small dust is referred to as a "fine dust", and a dust smaller than the "fine dust" is referred to as a "ultrafine dust".

The dust collector 100 may include an outer case 101, the first cyclone 110, and the second cyclone 120. The outer case 101 may accommodate the first and second cyclones 110, 120 and form a side surface appearance of the dust collector 100. The outer case 101 may be formed in a cylindrical shape as illustrated in the drawing, but the present disclosure may not be necessarily limited thereto.

An upper cover 140 may be mounted on the outer case 101 to cover the first and second cyclones 110, 120. The upper cover 140 may include an intake guide 140a and an exhaust guide 140b of the dust collector 100, respectively. The intake guide 140a may extend toward an inner circumference of the outer case 101 in such a manner that the sucked air is tangentially introduced into the outer case 101 and circulates along an inner circumference of the outer case 101.

The first cyclone 110 may be installed within the outer case 101. The first cyclone 110 may be provided at an upper portion within the outer case 101. The first cyclone 110 may filter foreign matter and dust from the air introduced into the outercase 101 and further introduce the air from which foreign matter and dust have been filtered into the first cyclone 110.

The first cyclone 110 may include a housing 111 and a mesh filter 112. The housing 111 may form an outer appearance of the first cyclone 110, and may be formed in a cylindrical shape similar to the outer case 101. The housing 111 may include a support portion 111a that couples with the outer case 101 so as to protrude in a radial direction. For example, the support portion or vane 111a may protrude on an upper portion of the housing 111 along an outer circumference thereof, and the support portion 111a may be coupled to an upper portion of the outer case 101.

The housing 111 may be vacant thereinside to accommodate the second cyclone 120. An outer circumference of the housing 111 may be formed with opening portions communicating with an inside thereof. The openings may be formed at a plurality of positions along an outer circumference of the housing 111.

The mesh filter 112 may be provided in the housing 111 to cover the opening portions, and have a mesh or porous shape allowing air to pass therethrough. The mesh filter 112 may separate foreign matter and dust from air introduced into the housing 111.

A size criterion for distinguishing between dust and fine dust may be determined by the mesh filter 112. A small dust passing through the mesh filter 112 may be classified a "fine dust," and a large dust that is unable to pass through the mesh filter 112 may be classified as a "dust."

Considering a process of separating foreign matter and dust by the first cyclone 110 in detail, air containing foreign matter, dust and fine dust may be introduced into an annular space between the outer case 101 and the first cyclone 110 through an outlet 140a" (refer to FIG. 20) of the intake guide 140a to be swirled by air in the annular space. During the process, relatively heavier foreign matter and dust may gradually flow downward while the air swirls in a spiral manner in a space between the outer case 101 and the first cyclone 110 by a centrifugal force, and may be collected in the first storage section (D1) which will be described later.

On the other hand, unlike foreign matter and dust, air may be introduced into the housing 111 through the mesh filter 112 by suction power. At this time, fine dust relatively lighter than dust may be introduced into the housing 111 along with air.

Referring to FIG. 3, an internal structure of the dust collector 100 and a flow of air within the dust collector 100 are seen. The second cyclone 120 may be provided in the first cyclone 110 to separate fine dust from air introduced thereinto through the entrance port 120a. As illustrated in the drawing, a plurality of second cyclones 120 may be provided therein. A central axis of the second cyclones 120 may be arranged in parallel to that of the first cyclone 110.

Contrary to a vertical arrangement of the related art in which the second cyclone is provided above the first cyclone, the second cyclone 120 of the present disclosure may be accommodated into the first cyclone 110 to decrease a height of the dust collector 100. The second cyclone 120 may not protrude above the first cyclone 110.

In addition, the second cyclone in the related art may have a guide passage extending from one side thereof such that air and fine dust is tangentially introduced thereinto to circulate along an inner circumference of the second cyclone, but the second cyclone 120 of the present disclosure may not have such a guide passage. Therefore, the second cyclone 120 may have a circular shape when seen from the top.

Referring to FIG. 3, cyclones provided adjacent to each other among the first and second cyclones 110, 120 may define a first space S1. In other words, in a region where the second cyclone 120 is provided within the first cyclone 110, a vacant space excluding the second cyclone 120 may be understood as a first space (S1). The first space (S1) may form a passage through which air and fine dust introduced into the first cyclone 110 can be introduced into an upper portion of the second cyclone 120.

Each of the second cyclones 120 may be provided along a vertical direction, and a plurality of the second cyclones 120 may be provided parallel to each other. According to such an arrangement, the first space (S1) may extend in a vertical direction within the first cyclone 110.

The second cyclones 120 may be in contact with each other. Specifically, a (circular) conical casing 121 forming an outer appearance of any one of the second cyclones 120 may be in contact with a casing 121 of the adjacent second cyclone 120 to form a first space (S1) surrounded by the casing 121.

The casing 121 of any one of the second cyclones 120 may be integrally formed with the casing 121 of the adjacent second cyclone 120. According to the above structure, a plurality of second cyclones 120 may be modularized and provided in the first cyclone 110.

Furthermore, the second cyclones arranged along an inner circumference of the first cyclone 110 may be in contact with the inner circumferential surface of the first cyclone 110. Specifically, an inner circumferential surface of the housing 111 adjacent to each other and an outer circumferential surface corresponding to a cylindrical portion of the casing 121 may be in contact with each other.

According to the arrangement, the second cyclone 120 may be efficiently provided within the first cyclone 110. In particular, the second cyclone 120 of the present embodiment may not have a guide passage extending from one side of the second cyclone in the related art, and thus a larger number of second cyclones 120 may be provided within the first cyclone 110. Accordingly, even if the second cyclone 120 has a structure in which the second cyclone 120 is accommodated into the first cyclone 110, a number of the second cyclones 120 may not be decreased compared to the related art, thereby preventing a deterioration of cleaning performance.

A cover member (or cover) 130 may be provided at an upper portion of the second cyclone 120. The cover member 130 may cover the entrance ports 120*a* of the second cyclones 120 at preset intervals to form a second space (S2) communicating with the first space (S1) between the cover member 130 and the entrance portion 120*a*. The second space (S2) may extend in a horizontal direction on the second cyclone 120, and may communicate with the entrance portion 120*a* of the second cyclone 120. According to such a communication relationship, air introduced into the first cyclone 110 may be introduced into the entrance portion 120*a* at an upper portion of the second cyclone 120 through the first space (S1) and the second space (S2).

A vortex finder 122 that discharges air from which fine dust is separated may be provided at an upper center of the second cyclone 120. Due to such an upper structure, the entrance portion 120*a* may be defined as an annular space between an inner circumference of the second cyclone 120 and an outer circumference of the vortex finder 122.

The entrance portion 120*a* of the second cyclone 120 may include a guide vane 123 spirally extended along an inner circumference thereof. The guide vane 123 may be provided on an outer circumference of the vortex finder 122 or integrally formed with the vortex finder 122. The guide vane 123 may generate rotational flow in air flowing into the second cyclone 120 through the entrance portion 120*a*.

Considering the flow of air and fine dust introduced into the entrance portion 120*a* in detail, fine dust may gradually flow downward while spirally circulating along an inner circumference of the second cyclone 120, and may be finally discharged through the discharge port 120*b* and collected into the second storage section (D2). Furthermore, air relatively lighter than fine dust may be discharged to the vortex finder 122 at an upper portion thereof by the suction power of the fan module.

According to the above structure, contrary to the related art in which a high-speed rotation flow is generated in a biased manner to one region by a guide passage extended from one side of the second cyclone, a relatively uniform rotation flow may be generated over almost an entire region of the entrance portion 120*a*. Accordingly, a localized high-speed flow not occur compared to a second cyclone structure in the related art, thereby reducing flow loss due to this.

A plurality of guide vanes 123 may be provided therein, and may be spaced apart from each other at regular intervals along an outer circumference of the vortex finder 122. Each guide vane 123 may start from the same position at an upper portion of the vortex finder 122 and extend to the same position at a lower portion thereof.

For an example, four guide vanes 123 may be respectively provided at 90° intervals along an outer circumference of the vortex finder 122. A larger or smaller number of guide vanes 123 may be of course provided depending on a design change, and at least part of any one of the guide vanes 123 may overlap with another guide vane 123 in a vertical direction of the vortex finder 122.

Furthermore, the guide vane 123 may be provided within the first cyclone 110. According to such an arrangement, a flow within the second cyclone 120 may occur within the first cyclone 110. As a result, it may be possible to reduce noise due to the flow within the second cyclone 120.

A lower diameter of the vortex finder 122 may be smaller than an upper diameter thereof. According to such a configuration, an area of the entrance port 120*a* may be decreased to increase an inflow speed into the second cyclone 120, thereby limiting fine dust introduced into the second cyclone 120 from being discharged through the vortex finder 122 along with the air.

According to FIG. 3, a tapered portion 122*a*, a diameter of which gradually decreases as it goes toward an end portion thereof, may be formed at a lower portion of the vortex finder 122. On the contrary, the vortex finder 122 may be formed in such a manner that a diameter thereof gradually decreases from an upper portion to a lower portion thereof.

On the other hand, a communication hole 130a corresponding to the vortex finder 122 may be formed on the cover member 130. The cover member 130 may cover an inner space of the first cyclone 110 excluding the vortex finder 122. Though not shown in the drawing, the cover member 130 may include a protruding portion inserted into the vortex finder 122 and formed with a communication hole 130a therein.

An upper cover 140 may be provided on the cover member 130. The upper cover 140 may form an upper appearance of the dust collector 100. The upper cover 140 may include an intake guide 140a that introduces air sucked from the outside into the dust collector 100 and an exhaust guide 140b that discharges air discharged through a communication hole 130a to an outside of the dust collector 100. An inlet 140a' and an outlet 140b" may be respectively formed on the upper cover 140 for the inflow and outflow of air. According to the present drawing, the inlet 140a' may face forward, and the outlet 140b" may face backward.

Air discharged through the outlet 140b" of the dust collector 100 may be discharged to the outside through an exhaust port of the cleaner body 10. A porous prefilter configured to filter ultrafine dust from the air may be installed on a passage extended from the outlet of the dust collector 100 to the exhaust port of the cleaner body 10.

On the other hand, the discharge port 120b of the second cyclone 120 may pass through a bottom surface 111b of the first cyclone 110. A through hole for the insertion of the second cyclone 120 may be formed on the bottom surface 111b of the first cyclone 110.

A lower portion of the first cyclone 110 may include an inner case 150 to accommodate the discharge port 120b to form a second storage section (D2) that collects fine dust discharged through the discharge port 120b. The second storage section (D2) may be also referred to as a fine dust storage section in terms of forming a storage space for fine dust. A lower cover 160, which will be described later, may form a bottom surface of the second storage section (D2).

The inner case 150 may cover a bottom surface 111b of the first cyclone 110, and may accommodate the discharge port 120b of the second cyclone 120 therein. The inner case 150 may extend toward a lower portion of the outer case 101. The inner case 150 may have a bowl shape provided with a tapered portion having a narrower cross-sectional area at a lower end than an upper end thereof and a gradually reduced cross-sectional area as it goes downward.

The inner case 150 may be coupled to the housing 111 of the first cyclone 110 by a fastening device (e.g., bolt, hook, adhesive, etc.). Alternatively, the inner case 150 may be integrally formed with the housing 111.

On the other hand, foreign matter and dust filtered through the first cyclone 110 may be collected into the first storage section (D1) located below the first cyclone 110. The first storage section (D1) may be also referred to as a foreign-matter-dust storage section in terms of forming a space to store foreign matter and dust.

In the present drawing, the first storage section (D1) defined by the outer case 101 and a pressurizing unit (or compactor) 170 may surround the second storage section (D2). A bottom surface of the first storage section (D1) may be formed by the lower cover 160 which will be described later. Various flows (for example, an upward flow due to the rotation of the pressurizing portion (or blade) 172 provided in the pressurizing unit 170) including a high-speed rotational flow due to the suction power of the fan module are mixed within the dust collector 100.

Such complicated flows may also be a hindrance to the inflow of foreign matter and dust into the first storage section (D1). Furthermore, even if dust is collected in the first storage section (D1), dust may float within the first storage section (D1) due to vortex or the like. Due to a structure in which an annual space between the outer case 101 and the first cyclone 110 should be communicated with a space between the outer case 101 and the first storage section (D1) to collect foreign matter and dust, a case may occur where dust floating in the first storage section (D1) flows backward into the annular space according to circumstances. This may deteriorate the cleaning performance of the vacuum cleaner 1 as well as dust collecting performance.

Hereinafter, a structure capable of guiding the inflow of foreign matter and dust filtered by the first cyclone 110 into the first storage section (D1) and preventing dust collected in the first storage section (D1) from flowing backward will be described. A guide unit or screw 180 may be provided at a lower side of the first cyclone 110. The guide unit 180 may guide the inflow of foreign matter and dust filtered by the first cyclone 110 into the first storage section (D1) and prevent dust collected in the first storage section (D1) from being moved (i.e., flowing backward) to the first cyclone 110. The guide unit 180 may include a base 181 and a vane 182. The base 181 and the vane 182 may be integrally formed by injection molding.

The base 181 may be formed in a cylindrical shape similar to the housing 111. An outer circumferential surface of the base 181 may be parallel to an axial direction of the outer case 101. The vane 182 may protrude from an outer circumference of the base 181 toward an inner circumferential surface of the outer case 101 and spirally extend from an upper side thereof toward a lower side thereof. The vane 182 may be spirally extended along a flow direction of air introduced into the dust collector 100 and circulated along an inner circumference of the outer case 101.

In order to implement this, the vane 182 may be inclined in a direction corresponding to a side of the outlet 140a" of the intake guide 140a provided in the upper cover 140, which will be described later. Here, the corresponding direction denotes that when the side of the outlet 140a" of the intake guide 140a has a negative slope, the vane 182 has a negative slope.

When the vane 182 is formed to have such a directionality, foreign matter and dust contained in air, which spirally circulates and gradually flows down in an annular space between the outer case 101 and the first cyclone 110, may be naturally introduced into the first storage section (D1) at a lower side of the guide unit 180 along the vane 182. In other words, the vane 182 may guide the inflow of foreign matter and dust into the first storage section (D1).

The air introduced into the guide unit 180 may spirally circulate along the vane 182 and gradually flow downward. Due to this flow, dust introduced into the vane 182 or dust collected in the first storage section (D1) may not flow backward to a side of the first cyclone 110 due to the flow.

The vane 182 may protrude from an outer circumferential surface of the first cyclone 110 and may be provided adjacent to an inner circumferential surface of the outer case 101. Due to this arrangement, a space provided at an upper side of the guide unit 180 (an annular space between the outer case 101 and the first cyclone 110) may be partitioned from a space provided at a lower side of the guide unit 180 (the first storage section (D1)).

A plurality of vanes 182 may be spaced apart from each other at regular intervals along an outer circumference of the guide unit 180. Each vane 182 may start from the same position at an upper portion of the guide unit 180, and extend to the same position at a lower portion thereof. According to this, a substantially uniform rotational flow may be generated over an entire region of the annular space between the outer case 101 and the guide unit 180. Accordingly, it may be possible to reduce flow loss.

Any one vane 182 of the plurality of vanes 182 may be arranged in such a manner that at least part of the vane 182 overlaps with another vane 182 in a vertical direction of the guide unit 180. According to the above structure, even if a vertical flow toward the first cyclone 110 is instantaneously formed in the vane 182 or the first storage section (D1), it may be blocked by the overwrapping vane 182 at an upper side, thereby restricting an inflow to a side of the first cyclone 110.

Of course, the present disclosure is not limited thereto. A lower end of one vane 182 of the plurality of vanes 182 may be formed apart from an upper end of another guide vane 182 along an outer circumference of the guide unit 180. In other words, they may not overlap with each other in a vertical direction of the guide unit 180.

Referring to FIG. 3, both the first storage section (D1) and the second storage section (D2) may open toward a lower side of the outer case 101. A lower cover 160 may be coupled to the outer case 101 to cover the opening portions of the first storage section (D1) and the second storage section (D2), and configured to form a bottom surface of the first storage section (D1) and the second storage section (D2).

As described above, the lower cover 160 may be coupled to the outer case 101 to open and close a lower portion thereof. According to the present embodiment, the lower cover 160 may be coupled to to the outer case 101 through a hinge 161 to open and close a lower portion of the outer case 101 according to the rotation. However, the present disclosure is not limited thereto, and the lower cover 160 may be completely detachably coupled to the outer case 101.

The lower cover 160 may be coupled to the outer case 101 to form a bottom surface of the first storage section (D1) and the second storage section (D2). The lower cover 160 may be rotated by the hinge 161 to simultaneously discharge dust and fine dust to simultaneously open the first storage section (D1) and the second storage section (D2). When the lower cover 160 is rotated by the hinge 161 to open the first storage section (D1) and the second storage section at the same time, it may be possible to discharge dust and fine dust at the same time.

On the other hand, when dust accumulated in the first storage section (D1) is not collected in one place but dispersed, dust may be scattered or discharged to an unintended place during the process of discharging the dust. In order to overcome such a problem, the present embodiment is made to reduce a volume of dust by pressurizing the dust collected in the first storage section (D1) using the pressurizing unit 170.

Figure 16:
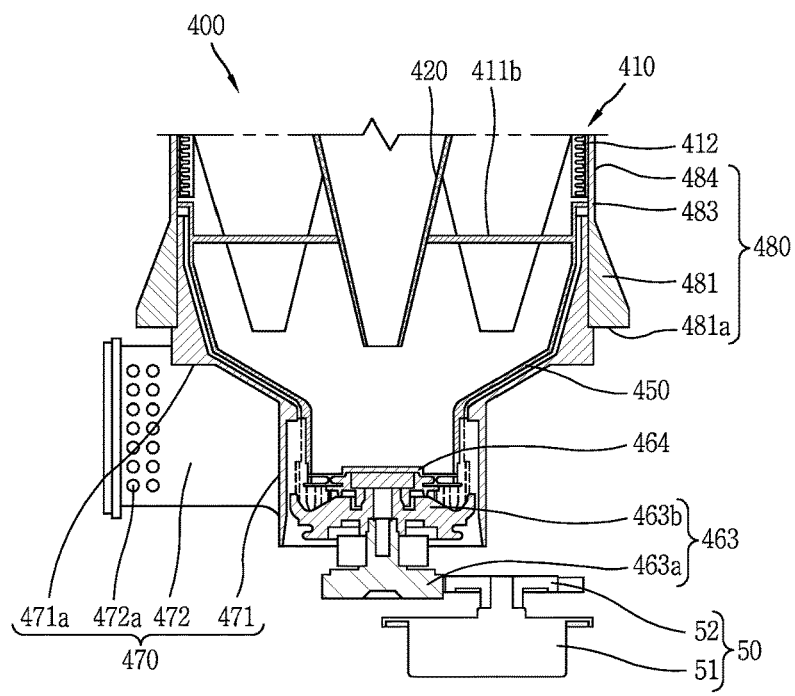
FIG. 16 is a cross-sectional view of the dust collector illustrated in FIG. 15.

The pressurizing unit 170 may be rotatable in both directions in the first storage section D1. The pressurizing unit 170 may include a rotating portion or shaft 171 and a pressurizing portion or blade 172. The rotating portion 171 may surround at least part of the inner case 150 and may receive a driving force from a drive unit or drive 50 (refer to FIG. 16) of the cleaner body 10 through a driving force transmission unit or transmission 163 to be relatively rotatable with respect to the inner case 150. The rotating portion 171 may be rotatable in a clockwise or counter-clockwise direction, or both directions.

An inner shape of the rotating portion 171 surrounding the inner case 150 may correspond to an outer shape of the inner case 150. According to the above structure, when the pressurizing unit 170 is rotated, the inner case 150 may hold the center of rotation. Accordingly, the rotation of the pressurizing unit 170 may be more stably carried out without a separate member to hold the center of rotation of the rotating portion 171.

The rotating portion 171 may be rotatable when engaged with the inner case 150. To this end, an engaging portion configured to support the rotating portion 171 with respect to a gravity direction may be formed on an outer circumference of the inner case 150. The engaging portion may be formed in various forms such as a projection, a hook, or the like.

According to the above structure, the rotating portion 171 may be engaged with the inner case 150, and then even if the lower cover 160 is rotated by the hinge 161 to open the first storage section (D1), the pressurizing unit 170 may be fixed in place. A fastening groove 171b to couple with a fastening member 163b of the driving force transmission unit 163, which will be described later, may be formed on a lower inner circumference of the rotating portion 171.

The pressurizing portion 172 may protrude in a radial direction from the rotating portion 171, and may rotate within the first storage section (D1) in accordance with the rotation of the rotating portion 171. The pressurizing portion 172 may be formed in a plate shape. Dust collected in the first storage section (D1) may be moved to one side of the first storage section (D1) by the rotation of the pressurizing portion 172 and collected therein, and when a lot of dust may be accumulated, the dust is pressurized and compressed by the pressurizing portion 172.

The pressurizing portion 172 may include a ventilation hole 172a for communicating air. The ventilation hole 172a may be formed on the pressurizing portion 172, and even if the pressurizing portion 172 rotates in the first storage section (D1), a pressure balance between both side regions of the pressurizing portion 172 divided by the pressurizing portion 172 may be adjusted, thereby suppressing an upward flow due to the rotation of the pressurizing portion 172.

An inner wall 101b that collects dust moved to one side by the rotation of the pressurizing portion 172 may be provided in the first storage section (D1). In the present embodiment, it is shown that the inner wall 101b may extend in a radial direction from a lower inner circumference of the outer case 101. Dust introduced into the first storage section (D1) may be collected on both sides of the inner wall 101b by the rotation of the pressurizing portion 172.

The lower cover 160 may include the driving force transmission unit 163 connected to the drive unit 50 provided on the cleaner body 10 when the dust collector 100 is mounted on the cleaner body 10, and connected to the pressurizing unit 170 when the lower cover 160 is mounted to cover a lower opening of the outer case 101. The drive unit 50 may include a drive motor 51 and a drive gear 52 connected to the drive motor 51 to be rotatable. At least part of the drive gear 52 may be exposed from the cleaner body 10 in such a manner that the drive gear 52 is configured to couple with a driven gear 163a of the driving force transmission unit 163, which will be described later, when the dust collector 100 is mounted on the cleaner body 10.

The driving force transmission unit 163 may be rotated by receiving a driving force from the drive unit 50 provided in the cleaner body 10, and may include a driven gear 163a and a fastening member (or fastening gear) 163b. The driven gear 163a may be exposed to a lower portion of the lower cover 160 and configured to be rotatable with respect to the lower cover 160. The driven gear 163a may couple with the drive gear 52 to receive a driving force of the drive motor 51 when the dust collector 100 is coupled to the cleaner body 10.

The fastening member 163b may be engaged with the driven gear 163a to be rotatable along with the driven gear 163a. The fastening member 163b may be exposed to an upper portion of the lower cover 160 and fastened to the fastening groove 171b provided on an inner circumference of the rotating portion 171 when the lower cover 160 is coupled to the outer case 101. The fastening member 163b may have a gear shape in which a plurality of fastening grooves 171b are provided to be spaced apart from each other at regular intervals on an inner circumference of the rotating portion 171, and the fastening member 163b may include a plurality of protrusion portions inserted into the fastening grooves 171b. Considering such a shape, the fastening member 163b may be referred to as a fastening gear.

A sealing unit (or seal) 164 may be mounted on the fastening member 163b. The sealing unit 164 may cover a lower opening of the inner case 150 when the lower cover 160 is coupled to the outer case 101. In other words, the sealing unit 164 may form a bottom surface of the second storage section (D2), thereby preventing the collected fine dust from being introduced into a side of the driving force transmission unit 163.

The sealing unit 164 may be configured not to rotate during the rotation of the driving force transmission unit 163. In other words, even if the driving force transmission unit 163 is rotated, the sealing unit 164 may be fixed to cover a lower opening of the inner case 150. A portion of the sealing unit 164 in contact with the lower opening of the inner case 150 may be formed of an elastic material to seal.

According to the above structure, when the lower cover 160 is coupled to the outer case 101, the driving force transmission unit 163 may be connected to the pressurizing unit 170 of the dust collector 100, and when the dust collector 100 is connected to the cleaner body 10, the driving force transmission unit 163 may be connected to the drive unit 50 of the cleaner body 10. In other words, a driving force generated from the drive unit 50 may be transmitted to the pressurizing unit 170 through the driving force transmission unit 163.

At this time, the rotation of the drive motor 51 may repeatedly perform a bidirectional rotation of the pressurizing portion 172. For example, the drive motor 51 may rotate in an opposite direction when a repulsive force is applied in a direction opposite to the rotational direction. In other words, when the pressurizing portion 172 rotates in one direction to compress dust collected in one side at a predetermined level, the drive motor 51 may rotate in the other direction to compress the dust collected in the other side.

When there is (almost) no dust, the pressurizing portion 172 may collide with the inner wall 101b to receive a corresponding repulsive force or receive a repulsive force by a stopper structure provided on a rotating path of the pressurizing portion 172 to rotate in an opposite direction. On the contrary, the controller within the cleaner body 10 may apply a control signal to the drive motor to change a rotational direction of the pressurizing portion 172 at regular intervals, thereby repeatedly generating the bidirectional rotation of the pressurizing portion 172.

By the pressurizing unit 170, dust collected in the first storage section (D1) may be gathered or compressed in a predetermined region. Therefore, it may be possible to suppress the scattering of dust during the process of throwing away dust, and remarkably reduce a possibility of being discharged to an unintended place.

Figure 4:
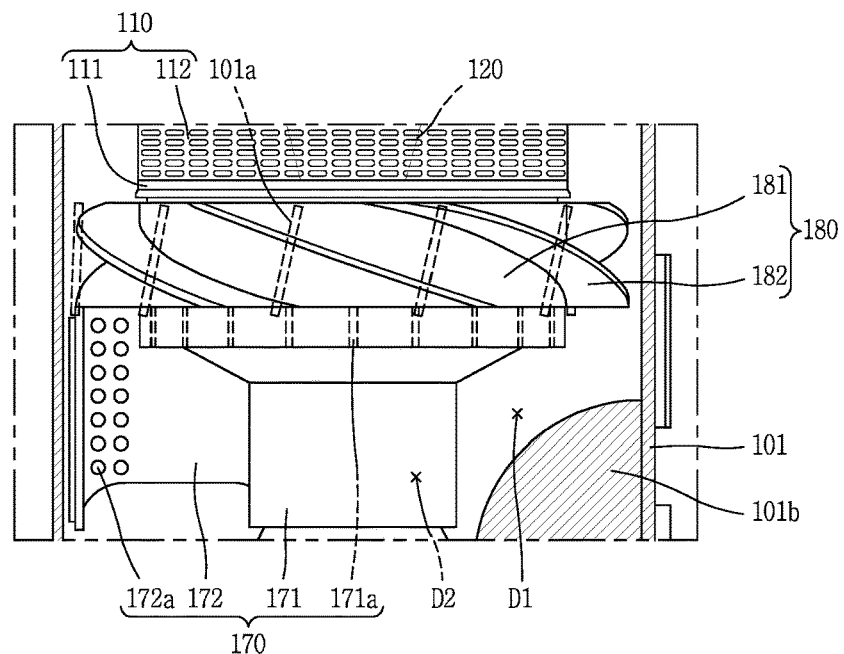
FIG. 4 is a front view of the dust collector illustrated in FIG. 2.
Figure 5:
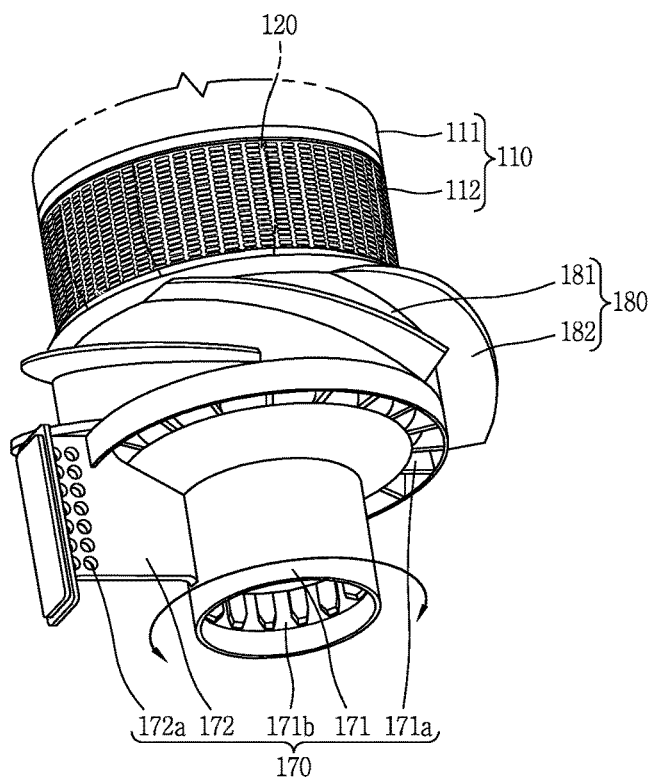
FIG. 5 illustrates the dust collector of FIG. 2 from a lower side in a state that an outer case thereof is removed.
Figure 6:
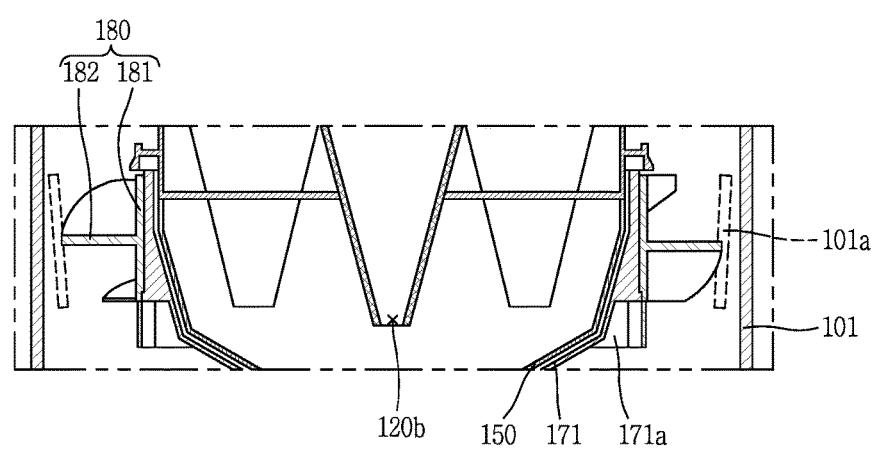
FIG. 6 is a cross-sectional view of the dust collector illustrated in FIG. 4.

Hereinafter, a structure in which the guide unit 180 is connected to the pressurizing unit 170 to be rotatable will be described. Referring to FIGS. 4 through 6 along with the previous drawings, the guide unit 180 may be connected to the pressurizing unit 170 and configured to be rotatable in at least one direction along with the pressurizing unit 170. In terms of configuring the guide unit 180 to be rotatable, the guide unit 180 may also be referred to as a rotating unit.

Referring to FIG. 4, when the guide unit 180 rotates in a counter-clockwise direction (to the right) corresponding to an extension direction in a lower side of the vane 182, foreign matter and dust in air introduced into the vane 182 may be moved downward by the rotation of the vane 182. Accordingly, the foreign matter and dust that have been introduced into the vane 182 may be more easily collected into the first storage section (D1). Furthermore, even if the foreign matter collected in the first storage section (D1) is introduced into the vane 182, it may be pushed back by the rotation of the vane 182. Considering that a flow spirally circulating and gradually flowing downward is generated on the vane 182, the backflow of foreign matter and dust may be even more difficult.

On the contrary, when the guide unit 180 rotates in a clockwise direction (to the left) corresponding to an extending direction in an upper side of the vane 182, foreign matter and dust in air introduced into the vane 182 may be moved upward by the rotation of the vane 182. However, since a flow spirally circulating and gradually flowing downward is generated on the vane 182, it may be difficult for such a movement and a resultant backflow of foreign matter and dust to occur.

However, when the guide unit 180 rotates in a direction corresponding to an extending direction at an upper side of the vane 182, the following structure may be added in consideration of the possibility of a backflow of foreign matter. As illustrated in the drawing, a backflow limiting rib 101a inclined in a direction intersecting the vane 182 may protrude from an inner circumferential surface of the outer case 101 facing the vane 182. A plurality of backflow limiting ribs 101a may be provided spaced apart at preset intervals along an inner circumferential surface of the outer case 101.

The backflow limiting rib 101a may be integrally formed with the outer case 101 by injection molding. However, the present disclosure is not limited thereto. The backflow limiting rib 101a may be formed as a separate member from the outer case 101, and attached to an inner circumferential surface of the outer case 101.

Due to the formation of the backflow limiting rib 101a, foreign matter flowing backward from the first storage section (D1) into the vane 182 may be caught by the backflow limiting rib even if the foreign matter is moved upward by the rotation of the vane 182. Accordingly, foreign matter may not completely flow backward to an upper side of the guide unit 180, to be collected again into the first storage section (D1).

When either one of the vane 182 and the backflow limiting rib 101a has a positive slope with respect to a rotating shaft of the guide unit 180, the other one may have a negative slope. In FIG. 4, it is shown in the drawing that the vane 182 has a negative slope, and the backflow limiting rib 101a is formed to have a positive slope. According to the above structure, the guide unit 180 may rotate in a clockwise direction (to the left) corresponding to the extending direction of the vane 182, so that the foreign object in the first storage section (D1) rides on the vane 182 Even if it rises, it may be continuously caught in the backflow limiting rib 101*a* to drop.

Of course, the inclination relationship of the vane 182 and the backflow limiting rib 101*a* is not limited to the above example. The backflow limiting rib 101*a* may be provided in parallel to a rotating shaft of the guide unit 180. In other words, the backflow limiting rib 101*a* may be provided perpendicular to the lower cover 160. Alternatively, the backflow limiting rib 101*a* may be inclined along a flow direction of air introduced into the outer case 101 similarly to the vane 182.

On the other hand, the rotation of the guide unit 180 may be carried out by coupling the guide unit 180 to the pressurizing unit 170. In other words, as described above, the pressurizing unit 170 may be rotated by receiving a driving force from the drive unit 50 through the driving force transmission unit 163, and thus the guide unit 180 coupled to the pressurizing unit 170 may also be rotated at the same time during the rotation of the pressurizing unit 170.

Specifically, the base 181 of the guide unit 180 may be coupled to the rotating portion 171 of the pressurizing unit 170. The coupling between the base 181 and the rotating portion 171 may be achieved by various methods such as coupling due to bonding, coupling using a hook member, and a coupling using a hook structure.

Figure 7:
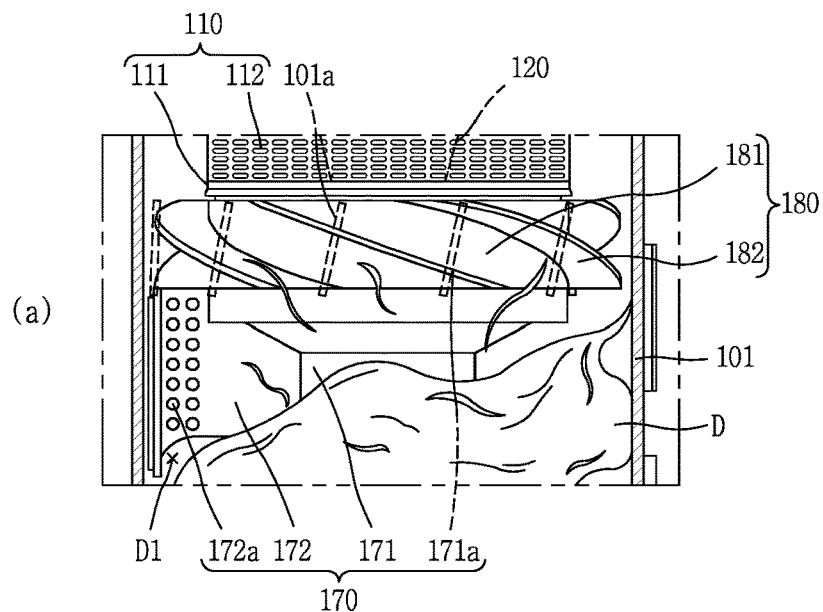
FIG. 7 is a view in which the variance of shapes of foreign matter stored in a first storage section are compared according to whether or not there exists a roller portion.
Figure 7:
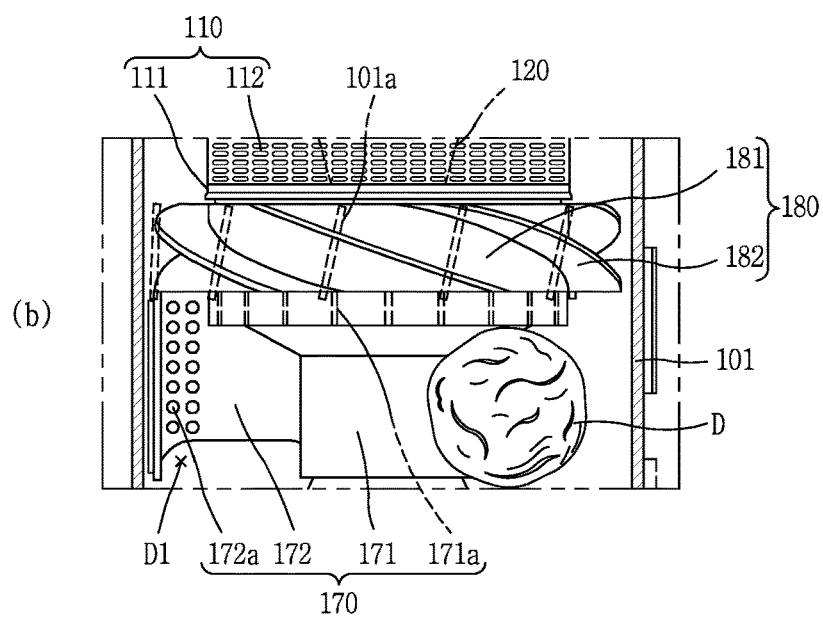

As illustrated in part (a) of FIG. 7, as foreign matter and dust (D) collected in the first storage section (D1) accumulate, they may gradually become closer to a side of the first cyclone 110. In particular, in the case of a bulky foreign matter, even if it is collected in the first storage section (D1), it may be spread in the first storage section (D1) without having an aggregated shape, thereby causing a backflow in an upward direction at a side where the foreign matter and dust (D) accumulate.

In order to solve such a problem, as illustrated in part (b) of FIG. 7, a roller portion (or roller) 171*a* including a plurality of ribs extended in a radial direction at preset intervals may be provided on at least one of the guide unit 180 and the pressurizing unit 170 to face a lower side of the outer case 101. The roller portion 171*a* may provide a rotational force to foreign matter and dust collected in the first storage section (D1) during the rotation of at least one of the guide unit 180 and the pressurizing unit 170.

In an embodiment illustrated in FIGS. 2 through 6 including part (b) of FIG. 7, a plurality of ribs constituting the roller portion 171*a* may respectively extend in a radial direction at preset intervals to the rotating portion 171 facing the lower cover 160. According to the configuration, an upper portion of the foreign matter and dust (D) collected in the first storage section (D1) may repeatedly collide with the plurality of ribs during the rotation of the rotating portion 171. As a result, the foreign matter and dust (D) may be rotated as illustrated in FIG. 7B, and finally the collected foreign matter and dust (D) may be rolled in a state of being agglomerated in a substantially spherical shape.

As described above, the foreign matter and dust (D) may be agglomerated in a spherical shape by the roller portion 171*a,* and thus it may be possible to prevent a backflow due to the accumulation of the foreign matter and dust (D) at a predetermined level. When the pressurizing portion 172 is additionally combined with the roller portion 171*a,* the agglomeration and compression of the foreign matter and dust (D) may be carried out at the same time to enhance the collection performance of the foreign matter and dust (D), thereby significantly reducing the possibility of backflow.

Figure 8:
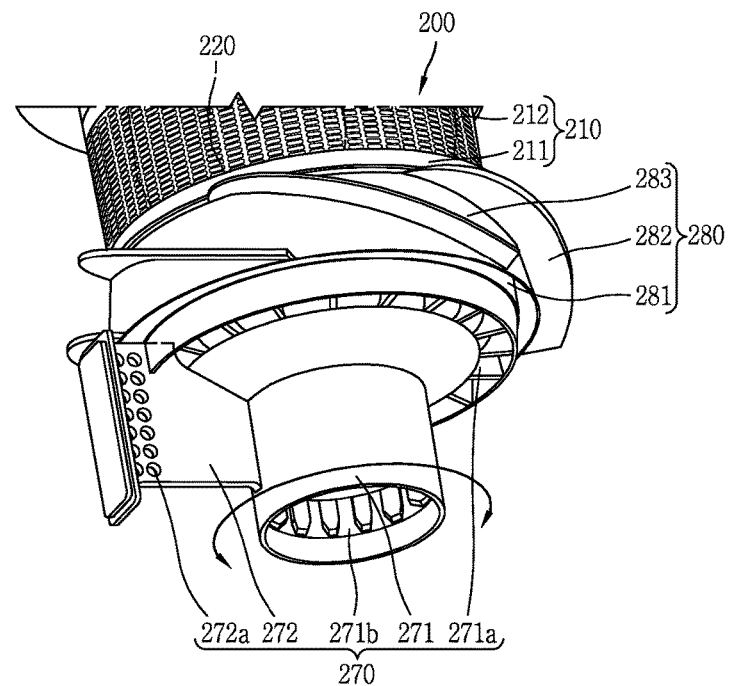
FIG. 8 is a view illustrating a modified example of a guide unit.
Figure 9:
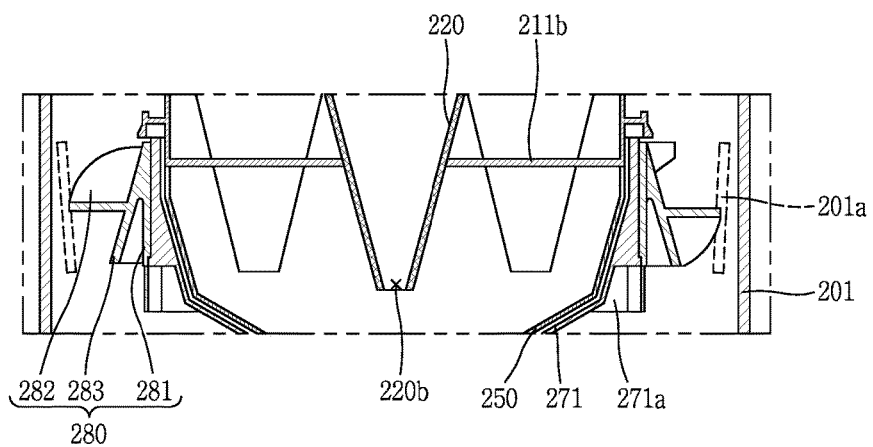
FIG. 9 is a cross-sectional view of the dust collector illustrated in FIG. 8.

Referring to FIGS. 8 and 9, the guide unit or screw 280 may have a skirt 283 extended downward from an upper portion thereof in an inclined downward direction. A gap between the skirt 283 and the outer case 201 may gradually decrease as it goes from the upper portion to the lower portion.

As the skirt 283 is formed, foreign matter and dust falling without passing through a mesh filter 212 of the first cyclone 210 may be guided by the skirt 283 and introduced into the first storage section (D1), but the foreign matter and dust collected in the first storage section (D1) may be restricted from flowing upward by the skirt 283. In other words, a backflow of foreign matter and dust collected in the first storage section (D1) may be restricted by the skirt 283.

Considering a structure in which the skirt 283 is provided in the guide unit 280 in more detail, the guide unit 280 may include a base 281, the skirt 283, and a vane 282. The base 281, the skirt 283, and the vane 282 may be integrally formed by injection molding. The base 281 may be coupled to a rotating portion 271 of the pressurizing unit 270. The base 281 may be formed in parallel to an axial direction of the outer case 201.

The skirt 283 may extend downward in an inclined manner outward from an upper portion of the base 281. Accordingly, a gap between the skirt 283 and the base 281 may gradually increase as it goes from the upper portion to the lower portion. Though not shown in the drawing, a plurality of ribs forming the foregoing roller portion may extend in a radial direction in the gap between the base 281 and the skirt 283.

The vane 282 may protrude from the skirt 283 toward an inner circumferential surface of the outer case 201, and spirally extend from the upper side toward the lower side. The vane 282 may be introduced into the dust collector 200 and may spirally extend along a flow direction of air circulating along an inner circumference of the outer case 201.

According to the drawing, the base 281 and the skirt 283 may be distinguished from each other in shape. However, the present disclosure is not limited thereto. As a modified example, the base 281 and the skirt 283 may be configured as one portion in which the base 281 and the skirt 283 are not separated from each other (a gap between the base 281 and the skirt may be filled), and it may be referred to as a skirt portion. An inner side of the skirt portion may be coupled to the rotating portion 271, and an outer side thereof may be inclined downward.

On the other hand, most of the foreign matter or dust that has not passed through the first cyclone 110 may fall down and be collected in the first storage section (D1), but according to circumstances, foreign matter or dust may be caught or accumulated and fixed on the mesh filter 112. It may reduce an area of the mesh filter 112 allowing air to pass therethrough, thereby increasing a load on the fan module that provides suction power as well as visually giving a non-clean impression to the user.

In order to solve this problem, a method of disassembling and cleaning the dust collector may be taken into consideration, but it may cause usage inconveniences to the user. There may also be a problem that cleaning is not easy, in fact, due to a structure in which a portion where the first cyclone is provided is partitioned from the first storage section (for example, partitioned by the vane 182 of the guide unit 180 or a skirt which will be described later).

Figure 10:
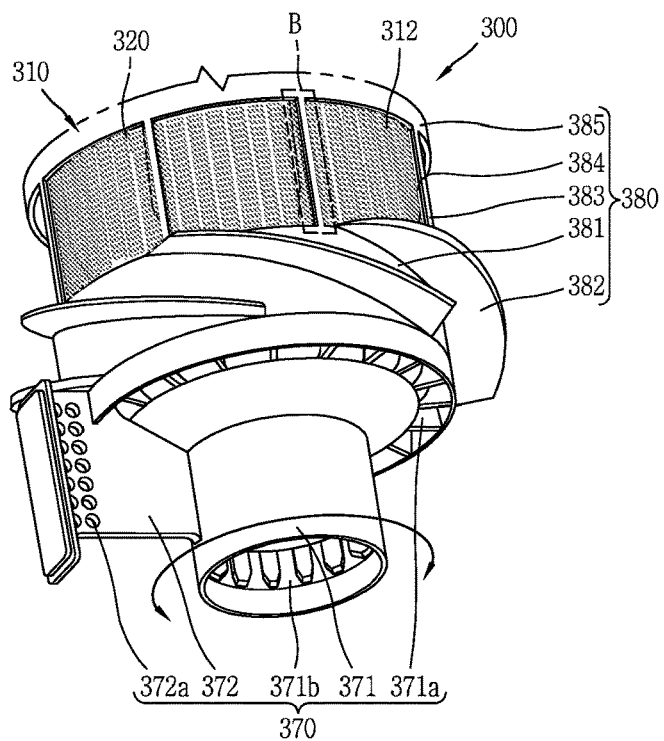
FIG. 10 is a perspective view illustrating another example of the dust collector illustrated in FIG. 1.
Figure 11:
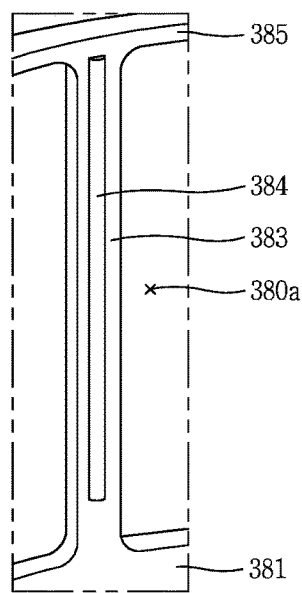
FIG. 11 is an enlarged view illustrating an inner side of portion "B" illustrated in FIG. 10.
Figure 12:
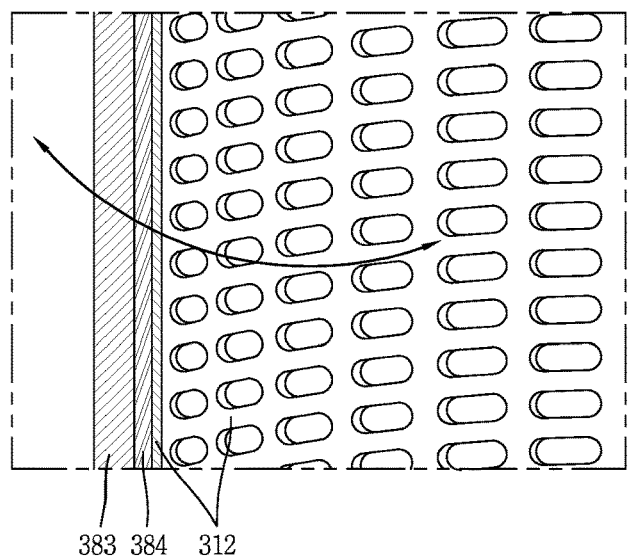
FIG. 12 is a cross-sectional view illustrating portion "B" illustrated in FIG. 10.
Figure 13:
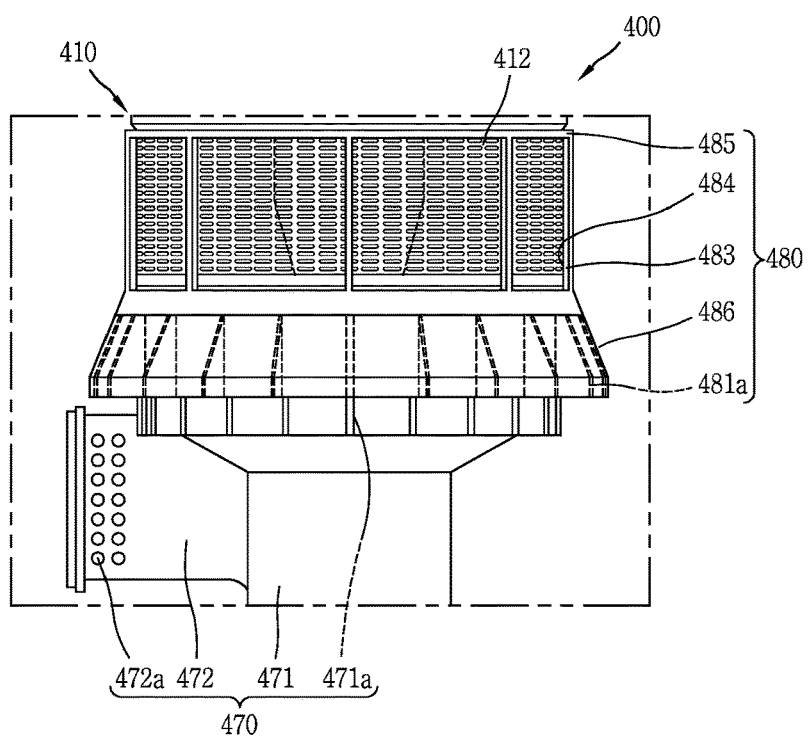
FIG. 13 is a conceptual view illustrating a modified example of a rotatable shell illustrated in FIG. 10.
Figure 14:
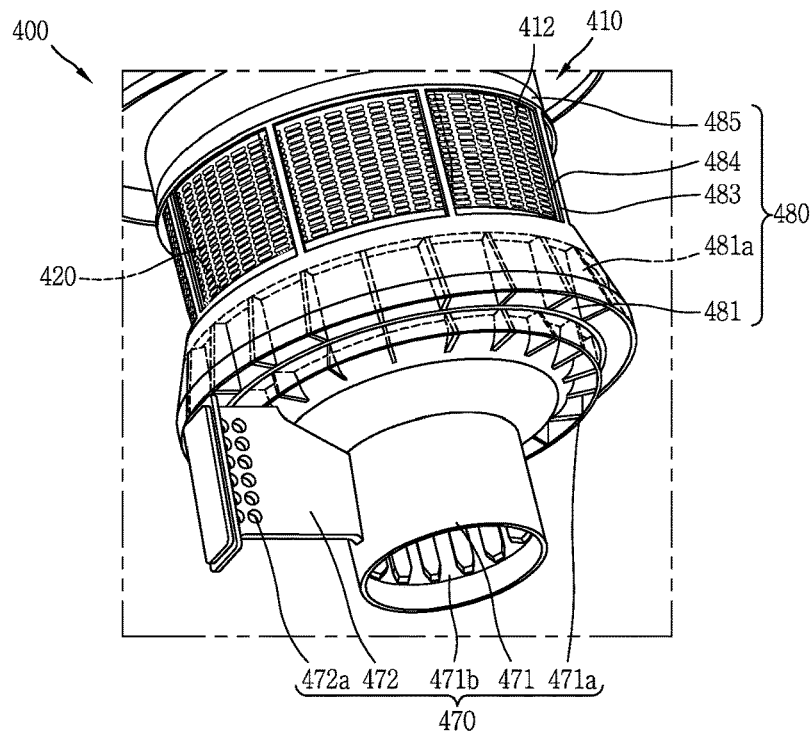
FIG. 14 is an orthogonal view of the dust collector illustrated in FIG. 13.
Figure 15:
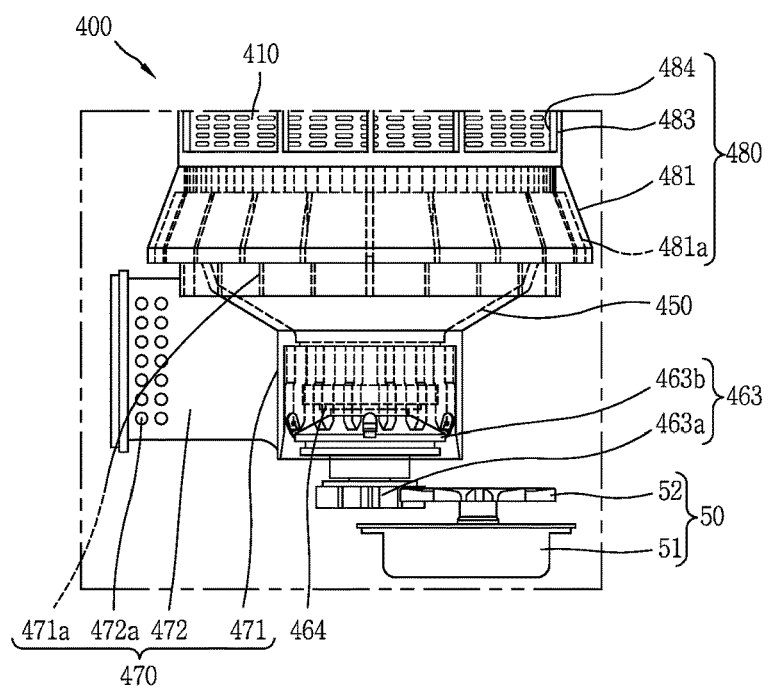
FIG. 15 is a view explaining a structure in which a driving force of a drive motor is transmitted to a rotatable shell by a driving force transmission unit.

Hereinafter, a structure capable of continuously removing foreign matter and dust from being caught or accumulated on the mesh filter 112 during the operation of the vacuum cleaner 1 will be described. Referring to FIGS. 10 through 12, a rotating unit or screw 380 may be coupled to the pressurizing unit 370 to rotate along with the pressurizing unit 370. As illustrated in the drawing, the rotating unit 380 may surround at least part of the first cyclone 310, and may be relatively rotatable with respect to the first cyclone 310 in at least one direction.

The rotating unit 380 may scratch or sweep off foreign matter and dust caught or accumulated on the mesh filter 312 of the first cyclone 310 during rotation. In order to implement this, the rotating unit 380 may include a lower frame 381, an upper frame 385, and a pillar 383. The lower frame 381 may be coupled to the rotating portion 371 of the pressurizing unit 370, and formed in a cylindrical shape at a lower portion or lower side of the first cyclone 310. For example, a lower frame 381 may surround a lower end of the first cyclone 310.

In the present embodiment, the lower frame 381 may be similar to the base 181 of the guide unit 180 described above. The lower frame 381 may be formed in parallel to an axial direction of the outer case 301. The vane 382 may protrude from the lower frame 381 toward the inner circumferential surface of the outer case 301. The vane 382 may spirally extend from the upper side toward the lower side. The vane 382 may be introduced into the dust collector 300 and extend in a spiral shape along a flow direction of air circulating along an inner circumference of the outer case 301.

The upper frame 385 may be spaced upward from the lower frame 381 by a predetermined distance and formed to surround an upper end of the first cyclone 310. The pillar 383 may cover the mesh filter 312 and extend along a vertical direction of the mesh filter 312 and connect to the lower frame 381 and the upper frame 385, respectively. In other words, the lower frame 381 may be connected to a lower end of the pillar 383, and the upper frame 385 may be connected to an upper end of the pillar 383 so as to surround part of the first cyclone 310 as a whole.

A plurality of pillars 383 may be provided therein, and provided at preset intervals along an outer circumference of the first cyclone 310. As a result, an opening may be formed between adjacent two pillars 383, and the mesh filter 312 may be exposed through the opening. Accordingly, air spirally flowing through an annular space between the outer case 301 and the first cyclone 310 may pass through the mesh filter 312 exposed through the opening and flow into the first cyclone 310.

When the pressurizing unit 370 receives a driving force of the drive unit 50 from the driving force transmission unit 363 to rotate, the rotating unit 380 connected to the pressurizing unit 370 may be rotated along with the pillar 383, and at this time, the pillar 383 moves along an outer circumference of the mesh filter 312. A scraper 384 may be provided on an inner surface of the pillar 383 facing an outer surface of the mesh filter 312. The scraper 384 may have a shape extended along a length direction of the pillar 383, and may cross the mesh filter 312 in a vertical direction on the mesh filter 312.

The scraper 384 may scrape off or sweep up foreign matter and dust accumulated on the mesh filter 312 during the rotation of the rotating unit 380. To this end, the scrapers 384 may be in contact with the mesh filter 312. The scraper 384 may be configured as a brush, formed of an elastic material, or formed of a synthetic resin material similar to the pillar 383.

When the scraper 384 is configured as a brush, the brush may be inserted into a gap of the mesh filter 312 to effectively remove foreign matter or dust accumulated on the gap. When the scraper 384 is configured as a brush, the scraper 384 may be inserted into a slot formed along an extension direction of the pillar 383 and fixed to the pillar 383.

The scraper 384 may be formed of an elastic material (e.g., rubber, silicone, etc.), and integrally coupled to the pillar 383 by double injection molding. When the scraper 384 is formed of an elastic material, the scraper 384 may be brought into close contact with the mesh filter 312 to effectively sweep off foreign matter accumulated on the mesh filter 312.

The scraper 384 may be formed of the same synthetic resin material as the pillar 383 and integrally formed with the pillar 383 by injection molding. The scraper 384 may protrude along an extension direction of the pillar 383. In this case, the rotating unit 380 having a single material provided with the scraper 384 may be manufactured through one injection molding. On the other hand, the backflow limiting rib 101a described in conjunction with the embodiment of FIGS. 2 through 7 and the modified example of FIG. 8 may be combined with the vane 382 of the present embodiment.

Describing it in brief, the backflow limiting rib 101a inclined in a direction intersecting the vane 382 may protrude on an inner circumferential surface of the outer case 301 facing the vane 382. A plurality of backflow limiting ribs 101a may be spaced apart at preset intervals along an inner circumferential surface of the outer case 301.

Due to the formation of the backflow limiting rib 101a, foreign matter flowing backward from the first storage section (D1) into the vane 182 may be caught by the backflow limiting rib even if the foreign matter is moved upward by the rotation of the vane 182. Accordingly, foreign matter may not completely flow backward to an upper side of the guide unit 180, and may be collected again into the first storage section (D1).

Hereinafter, a modified example of the rotating unit 480 will be described with reference to FIGS. 13 through 16. Referring to FIGS. 13 through 16, the rotating unit 480 may include a lower frame 481, an upper frame 485, a pillar 483, a scraper 484, and a skirt 486. The modified example may have the same structure as the rotating unit 480 described in the previous embodiment excluding the skirt 486 and a roller portion (or roller) 481a. As a result, the redundant description thereof will be omitted.

The skirt 486 extended outward in an inclined downward direction may protrude on the lower frame 481. Accordingly, a gap between the skirt 486 and the lower frame 481 may gradually increase as it goes from the upper portion to the lower portion.

As the skirt 486 is formed, foreign matter and dust falling without passing through a mesh filter 412 of the first cyclone 410 may be guided by the skirt 486 and introduced into the first storage section (D1), but the foreign matter and dust collected in the first storage section (D1) may be restricted from flowing upward by the skirt 486. In other words, a backflow of foreign matter and dust collected in the first storage section (D1) may be restricted by the skirt 486.

However, since the gap between the outer case 401 and the skirt 486 decreases toward the lower side, it may cause a problem in which foreign matter may be caught in the gap when a size of the foreign matter is large. This may prevent other foreign matter and dust from flowing into the first storage section (D1) through the gap.

However, in the present modified example, the rotating unit 480 may be coupled with the pressurizing unit 470, and may be rotatable along with the pressurizing unit 470, and thus even if foreign matter is caught in a gap between the skirt 486 and the outer case 401, the foreign matter may be released by the rotation of the rotating unit 480. The foreign matter released from the gap may be introduced into the first storage section (D1) by rotational flow due to the driving of the vacuum cleaner 1.

On the other hand, roller portions 481a, 471a configured as a plurality of ribs extended in a radial direction at preset intervals may be provided on at least one of the rotating unit 480 and the pressurizing unit 470. On the present drawing, a first roller portion 481a and a second roller portion 471a may be provided in the rotating unit 480 and the pressurizing unit 470, respectively.

Describing the first roller portion 481a first, a plurality of ribs forming the first roller portion 481a may be formed in a gap between the lower frame 481 and the skirt 486 in a radial direction. The plurality of ribs may face a lower cover thereof. A plurality of ribs constituting the second roller portion 471a may extend in a radial direction at preset intervals on the rotating portion 471 facing the lower cover. As the rotating unit 480 may surround at least part of the pressurizing unit 470, the first roller portion 481a may surround the second roller portion 471a.

According to the above configuration, an upper portion of foreign matter and dust collected in the first storage section (D1) during the rotation of the pressurizing unit 470 and the rotating unit 480 coupled thereto may collide repeatedly with the plurality of ribs constituting the first and second roller portions 481a, 471a. As a result, the foreign matter and dust may be rotated, and finally the collected foreign matter and dust may be rolled in a state of being agglomerated in a substantially spherical shape.

The first and second roller portions 481a, 471a may have different heights with respect to the lower cover 460. In the present embodiment, the first roller portion 481a may be located above the second roller portion 471a. According to the above structure, the first or second rolls 481a, 471a corresponding to an accumulation height of foreign objects and dust may be suitably used to agglomerate the foreign matter and dust in a spherical shape. In other words, the first roller portion 481a may be used to agglomerate foreign matter and dust having a relatively larger volume than the second roller portion 471a into a spherical shape.

However, the present disclosure is not limited thereto. The first and second roller portions 481a, 471a may have the same height with respect to the lower cover 460. In this case, a plurality of ribs constituting the first roller portion 481a and a plurality of ribs constituting the second roller portion 471a may cross each other along a rotational direction.

As illustrated above in FIG. 1, the vacuum cleaner 1 may be configured in such a manner that air including foreign matter, dust, fine dust, and ultrafine dust, which are sucked through the suction unit 20, is directly introduced into the dust collector 100 without passing through the cleaner body 10. To this end, an upper cover 140 of the dust collector 100 may include an inlet and an outlet to introduce and discharge air, respectively, and the inlet may be directly connected to the connection unit 30 connected to the suction unit 20.

Hereinafter, the upper cover 140 having both an inlet and an outlet will be described in more detail. Referring to FIGS. 17 through 21 along with FIGS. 1 through 3, the upper cover 140 may be mounted on an upper side of the outer case 101 to cover the cover member 130. Accordingly, the upper cover 140 may cover both the first and second cyclones 110, 120. The upper cover 140 may form an upper appearance of the dust collector 100.

The upper cover 140 may include an intake guide 140a and an exhaust guide 140b which form passages separated from each other. The intake guide 140a may form a passage to introduce air into the outer case 101, and the exhaust guide 140b may form a passage to discharge air from which foreign matter, dust and fine dust have been separated while passing through the first and second cyclones 110, 120.

The intake guide 140a and the exhaust guide 140b may have an inlet 140a', 140b' and an outlet 140a", 140b", respectively. According to the present drawing, the inlet 140a' of the intake guide 140a may be open in a direction opposite to the outlet 140b" of the exhaust guide 140b.

The connection unit 30 connected to the suction unit 20 suck air containing foreign matter, dust and fine dust may be directly connected to the inlet of the intake guide 140a. The outlet of the intake guide 140a may be formed on a bottom surface of the upper cover 140 to communicate with an annular space between the outer case 101 and the first cyclone 110. At least part of the intake guide 140a may be bent and extended toward an inner circumference of the outer case 101 in such a manner that air introduced through the inlet 140a' performs a swirling movement in a spiral shape when flowing into the annular space.

In the present embodiment, the intake guide 140a may be formed as a single passage. In other words, the intake guide 140a may include one inlet 140a' and one outlet 140a". As a result, when compared with a modified example which will be described later, a cross-sectional area of the intake guide 140a may be increased to further reduce a phenomenon in which a large foreign matter is caught thereinside, and solve a problem of interference between structures and electronic components adjacent to the upper cover 140 at a predetermined level due to the simplification of the structure of the intake guide 140a.

The inlet of the exhaust guide 140b may be formed on a bottom surface of the upper cover 140 to communicate with an inner space of the vortex finder 122 located in the second cyclone 120. Referring to FIGS. 2 and 3, the cover member 130 may include a communication hole 130a corresponding to the vortex finder 122, and thus the inlet of the exhaust guide 140b may communicate with the communication hole 130a.

The inlet 140b' of the exhaust guide 140b may be formed on both sides of the intake guide 140a forming a single passage. The outlet 140b" of the exhaust guide 140b may communicate with the inlet 140b' of the exhaust guide 140b formed on both sides of the intake guide 140a.

Air discharged through the outlet 140b" of the exhaust guide 140b may be discharged directly to the outside or discharged to the outside through the exhaust port of the cleaner body 10 as illustrated in FIG. 1. In the latter case, a porous prefilter configured to filter ultrafine dust from the air may be installed on a passage extended from the outlet 140b" of the dust collector 100 to the exhaust port of the cleaner body 10.

Figure 17:
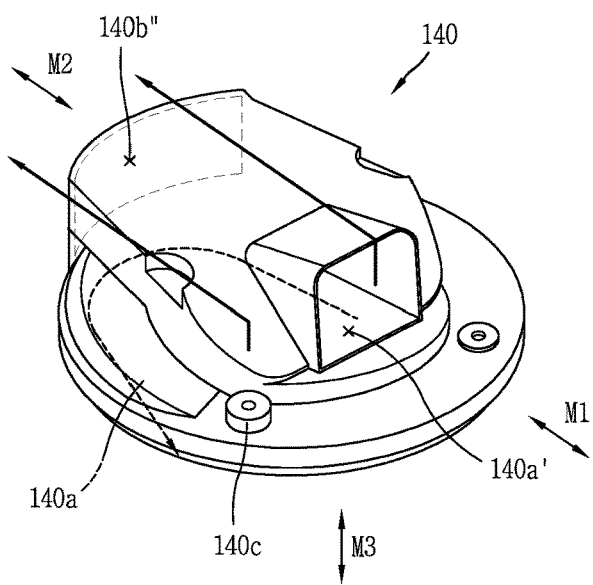
FIG. 17 is a view illustrating that an upper cover is separated from a dust collector illustrated in FIG. 2.
Figure 18:
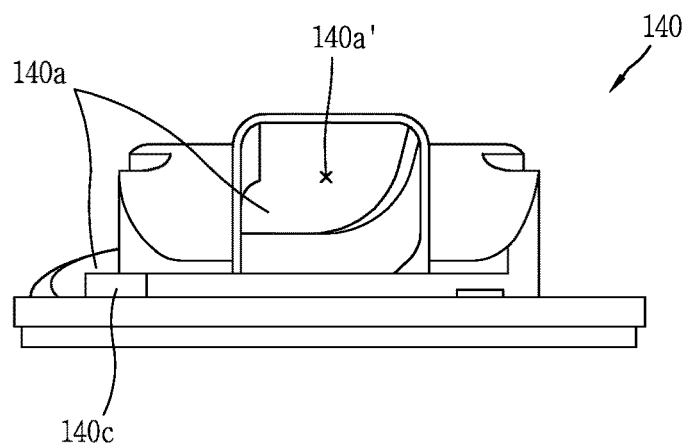
FIG. 18 is a view in which an inlet side of the upper cover illustrated in FIG. 17 is seen.
Figure 19:
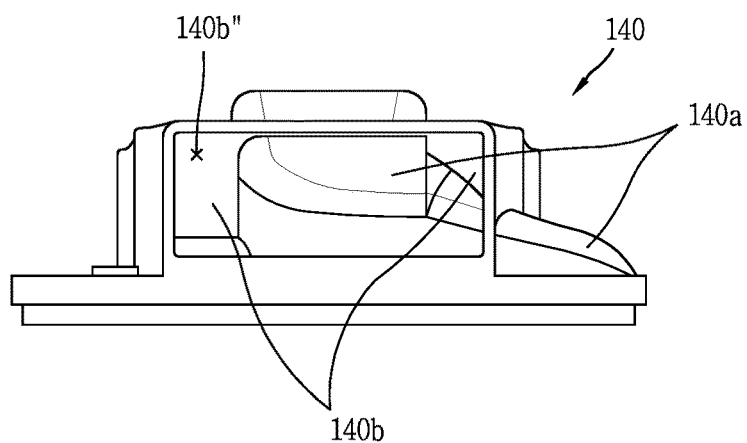
FIG. 19 is a view in which an outlet side of the upper cover illustrated in FIG. 17 is seen.

As described above, when the intake guide 140a is formed with a single flow path, and the exhaust guide 140b is formed using a vacant space of the intake guide 140a, it may be possible to provide the upper cover 140 having a secure suction efficiency. The upper cover 140 having the foregoing structure may be integrally formed by injection molding. As illustrated in FIG. 17, the upper cover 140 may be injection molded by three molds, which are assembled and separated in three directions, such as an inlet side (M1) of the intake guide 140a, an outlet side (M2) of the exhaust guide 140b, and a bottom side (M3) of the upper cover 140.

Parting lines due to injection molding in the three directions may be respectively formed on the upper cover 140. Accordingly, it may be possible to check how the upper cover 140 is manufactured (i.e., whether or not the upper cover 140 is manufactured by injection molding in the same manner as that of the present embodiment) based on the parting line. A problem in injection molding of the upper cover 140 depends on how to form the intake guide 140a and the exhaust guide 140b. In particular, when each of the intake guide 140a and the exhaust guide 140b is formed in three dimensions, a passage may be formed by at least two molds, and the two molds must be able to meet with each other.

Figure 20:
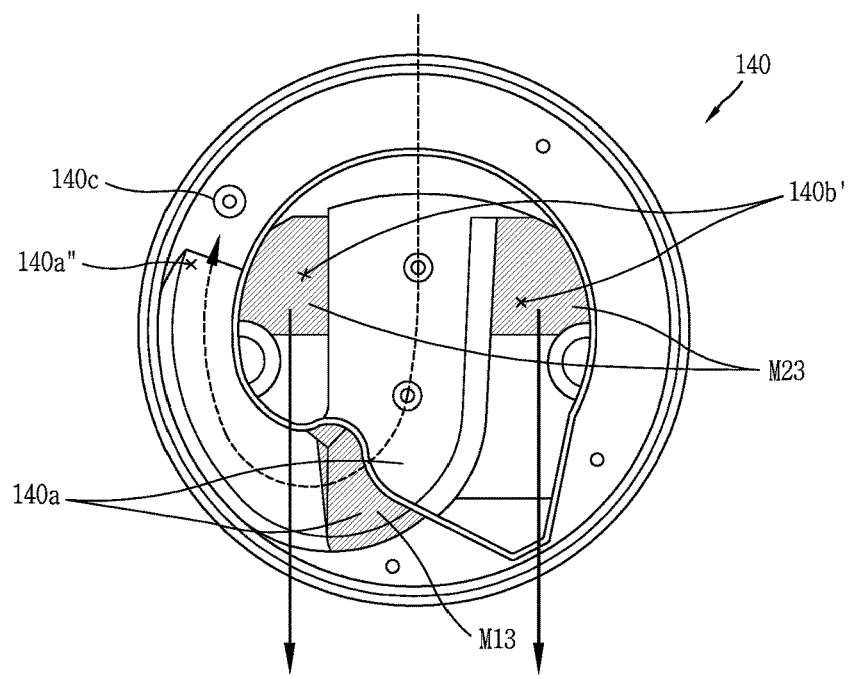
FIG. 20 illustrates a bottom side of the upper cover illustrated in FIG. 17.
Figure 21:
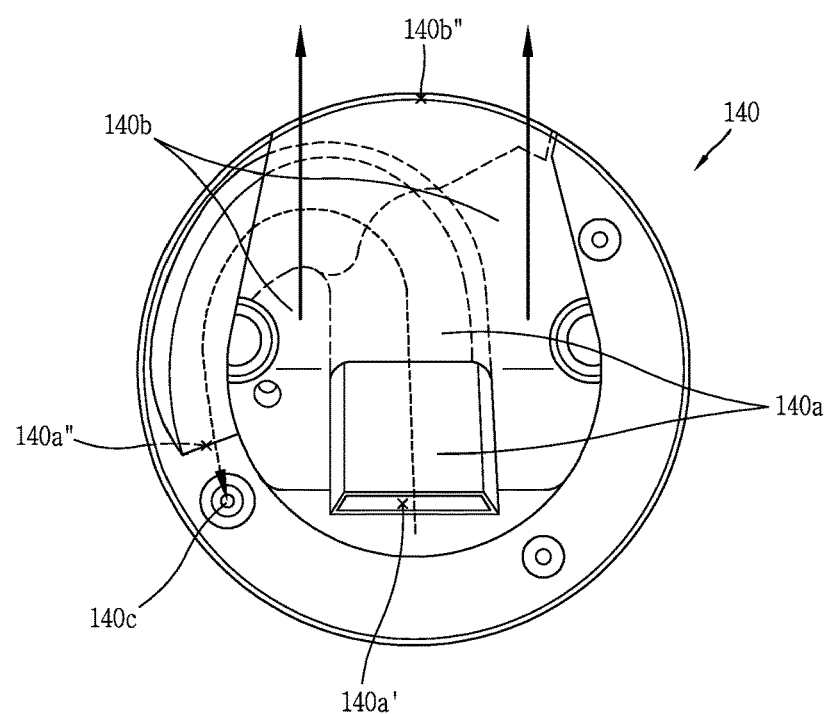
FIG. 21 is a view illustrating a flow current in the upper cover illustrated in FIG. 17.
Figure 22:
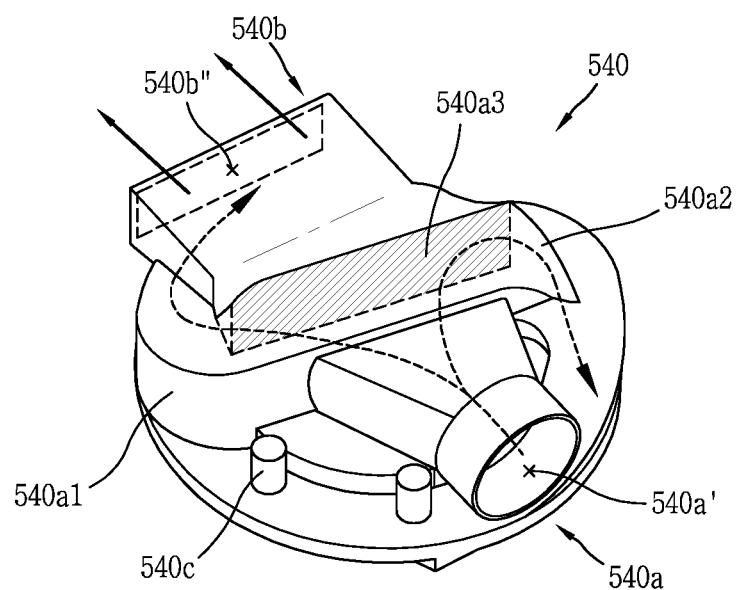
FIG. 22 is a view illustrating a modified example of the upper cover illustrated in FIG. 17.
Figure 23:
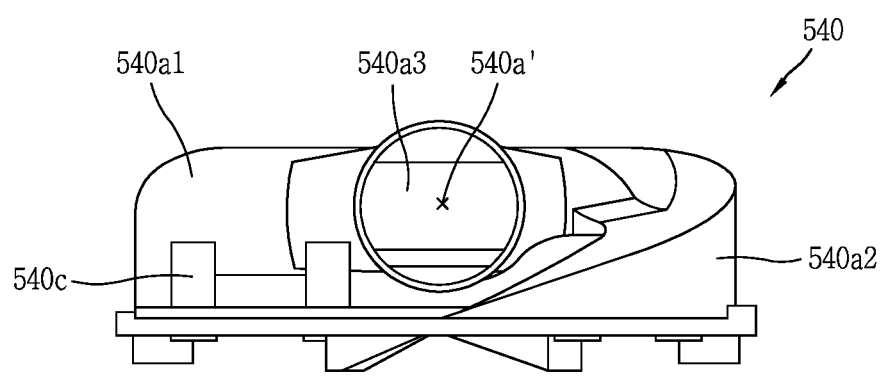
FIG. 23 illustrates an inlet side of the upper cover illustrated in FIG. 22.
Figure 24:
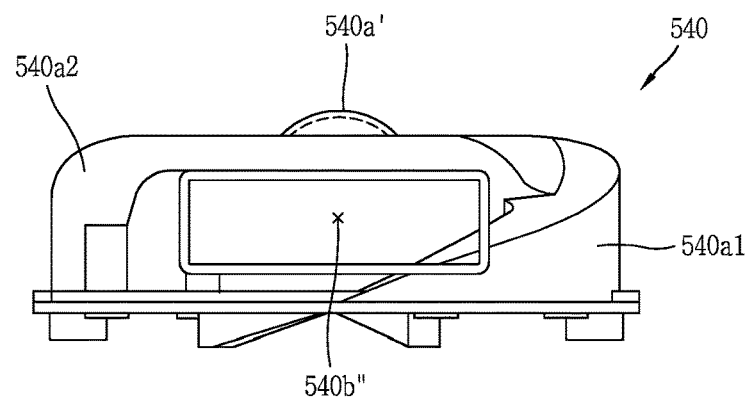
FIG. 24 illustrates an outlet side of the upper cover illustrated in FIG. 22.
Figure 25:
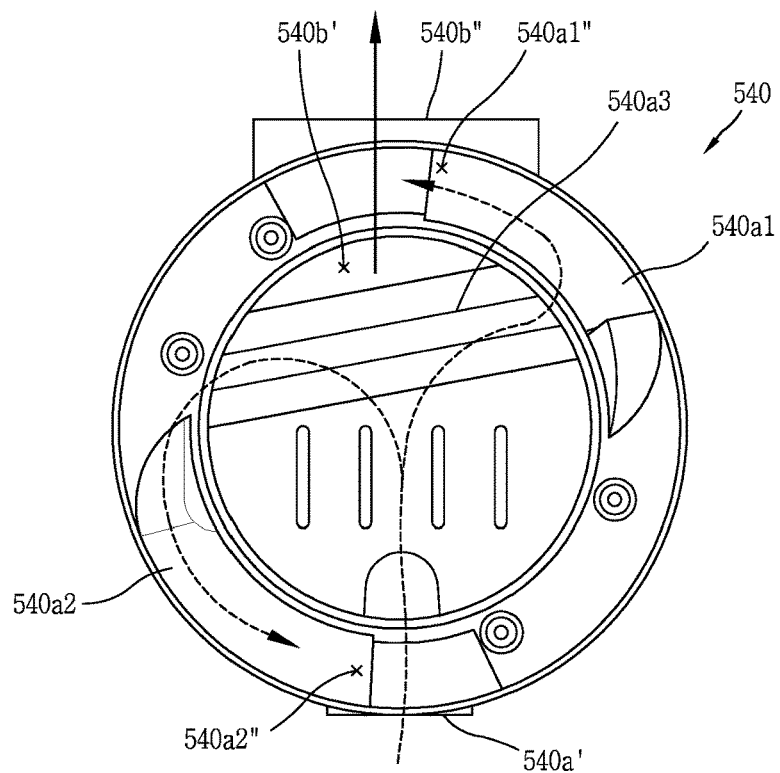
FIG. 25 illustrates a bottom side of the upper cover illustrated in FIG. 22.
Figure 26:
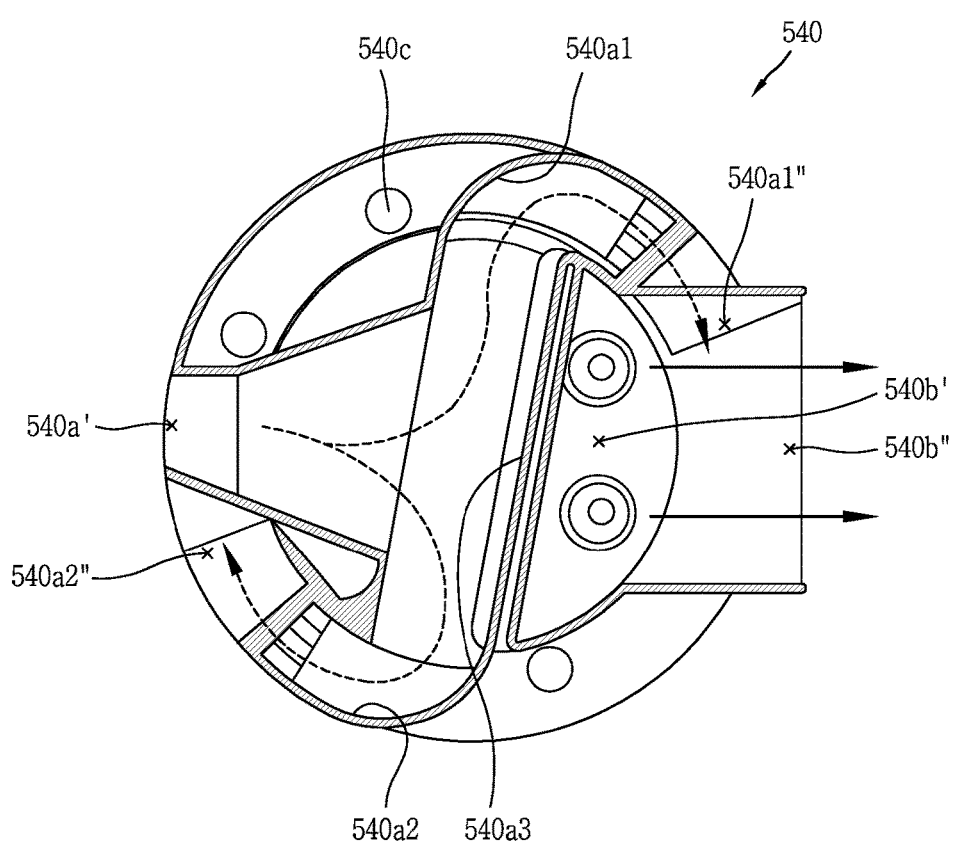
FIG. 26 is a view illustrating a flow current in the upper cover illustrated in FIG. 22.

Referring to FIG. 20, the intake guide 140a may be formed by two molds assembled in two directions, such as the inlet side (M1) of the intake guide 140a and the bottom side (M3) of the upper cover 140. A region in which the two molds meet with each other is M13, and a parting line may be formed in the region.

Moreover, the exhaust guide 140b may be formed by two molds assembled in two directions, such as the outlet side (M2) of the exhaust guide 140b and the bottom side (M3) of the upper cover 140. A region in which the two molds meet with each other is M23 provided on both sides of the intake guide 140a, and a parting line may be formed in the region. In this manner, the upper cover 140 formed with the intake guide 140a and the exhaust guide 140b may be injection molded at one time using three molds. Accordingly, it may be possible to increase the mass production of the upper cover 140.

Hereinafter, a modified example of an upper cover 540 in which an intake guide 540a is configured with one inlet 540a' and two outlets 540a1", 540a2" will be described. Similarly to the foregoing embodiment, the upper cover 540 of the present modified example may cover the cover member 130 at an upper side of the outer case 101. Accordingly, the upper cover 540 may cover both the first and second cyclones 110, 120. The upper cover 540 may form an upper appearance of the dust collector 100.

Referring to FIGS. 22 to 26, the upper cover 540 may include an intake guide 540a and an exhaust guide 540b forming passages separated from each other. The intake guide 540a may form a passage to introduce air into the outer case 101, and the exhaust guide 540b may form a passage to discharge air from which foreign matter, dust and fine dust have been separated while passing through the first and second cyclones 110, 120.

The intake guide 540a and the exhaust guide 540b may include an inlet 540a', 540b' and an outlet 540a1", 540a2"/540b", respectively. According to the present drawing, the inlet 540a' of the intake guide 540a may have a shape that is open in a direction opposite to the outlet 540b" of the exhaust guide 540b.

The present modified example is different from the foregoing embodiment in that the intake guide 540a may have one inlet 540a' and two outlets 540a1", 540a2". The inlet 540a' of the intake guide 540a may be directly connected to the connection unit 30 connected to the suction unit 20 to suck air containing foreign matter, dust and fine dust. The two outlets 540a1", 540a2" of the intake guide 540a may be formed on a bottom surface of the upper cover 540 to communicate with an annular space between the outer case 101 and the first cyclone 110.

The intake guide 540a may include a branch wall 540a3, and a first and a second branch passages 540a1, 540a2. The branch wall 540a3 may be formed at a position facing the inlet of the intake guide 540a. Accordingly, air introduced through the inlet of the intake guide 540a may collide with the branch wall 540a3 to be scattered to both sides of the branch wall 540a3.

The branch wall 540a3 may be formed perpendicular to the inlet 540a' of the intake guide 540a. In this case, the air that has collided with the branch wall 540a3 may be evenly distributed to the left and right sides of the branch wall 540a3. However, in this case, due to a flow of air into the inlet 540a' of the intake guide 540a, foreign matter may become attached to the branch wall 540a3 facing the inlet 540a' to be stagnant.

In order to prevent this, as illustrated in the drawing, the branch wall 540a3 may be formed to be angled with respect to the inlet 540a' of the intake guide 540a. In other words, the branch wall 540a3 may be formed in a shape such that the left or right side thereof is angled closer to the inlet. According to the above structure, it may be configured such that foreign matter is movable along the angled branch wall 540a3, thereby solving a foreign matter stagnation phenomenon in a structure in which the branch wall 540a3 is formed perpendicular to the inlet 540a' of the intake guide 540a.

The first and second branch passages 540a1, 540a2 may be provided at both sides of the branch wall 540a3, and bent on at least part thereof and extended toward an inner circumference of the outer case 101 to perform a swirling movement in a spiral shape when air is introduced into an annular space between the outer case 101 and the first cyclone 110.

The first and second branch passages 540a1, 540a2 may extend in mutually the same rotational direction. In order to implement this, either one of the first and second branch passages 540a1, 540a2 may form a passage toward a rear side of the branch wall 540a3 and the other one may form a passage toward a front side of the branch wall 540a3.

The inlet 540b' of the exhaust guide 540b is formed on a bottom surface of the upper cover 540 to communicate with an inner space of the vortex finder 122 located in the second cyclone 120. As described above, when the communication hole 130a corresponding to the vortex finder 122 is formed on the cover member 130, the inlet 540b' of the exhaust guide 540b may communicate with the communication hole 130a.

The outlet 540b" of the exhaust guide 540b may communicate with the inlet 540b' of the exhaust guide 540b. Air discharged through the outlet 540b" of the exhaust guide 540b may be directly discharged to the outside, and discharged to the outside through an exhaust port of the cleaner body 10 as illustrated in FIG. 1. In the latter case, a porous prefilter configured to filter ultrafine dust from the air may be installed on a passage extended from the outlet of the dust collector 100 to the exhaust port of the cleaner body 10.

Meanwhile, the above-described vacuum cleaner may be configured as follows.

The vane may protrude from an outer circumferential surface of the first cyclone and may be adjacent to an inner circumferential surface of the outer case.

A plurality of vanes may be provided therein, and spaced apart from each other at regular intervals along an outer circumference of the guide unit. At least part of any one of the plurality of vanes may overlap with another vane in a vertical direction of the guide unit.

The guide unit may be rotatable in at least one direction with respect to the first cyclone. A backflow limiting rib inclined in a crossing direction with respect to the vane may protrude from an inner circumferential surface of the outer case facing the vane such that foreign matter introduced into the guide unit is caught while flowing back upward by the rotation of the guide unit.

When either one of the vane and the backflow limiting rib has a positive slope with respect to a rotating shaft of the guide unit, the other one thereof may have a negative slope. The backflow limiting rib may be parallel to a rotating shaft of the guide unit.

The backflow limiting rib may be inclined along a flow direction of air introduced into the outer case. A discharge port of the second cyclone may pass through a bottom surface of the first cyclone, and an inner case accommodating the discharge port may be provided at a lower portion of the first cyclone to form a second storage section for collecting fine dust discharged through the discharge port.

The dust collector may further include a pressurizing unit configured to be rotatable in both directions in the first storage section so as to pressurize foreign matter and dust collected in the first storage section formed below the guide unit to reduce a volume thereof, and the guide unit may be coupled to the pressurizing unit to rotate along with the pressurizing unit.

The pressurizing unit may include a rotating portion surrounding at least part of the inner case, and configured to be relatively rotatable with respect to the inner case; and a pressurizing unit formed to protrude from the rotating portion in a radial direction.

At least one of the guide unit and the pressurizing unit may include a roller portion positioned to face a lower side of the outer case, and configured with a plurality of ribs extended in respective radial directions at preset intervals. The dust collector may further include a lower cover hinge-coupled to the outer case to form a bottom surface of the first storage section and the second storage section, and configured to open the first storage section and the second storage section at the same time while rotating with respect to the outer case by the hinge.

The lower cover may include a driving force transmission unit configured to rotate by receiving a driving force from a drive unit provided in the cleaner body, and having a fastening member configured to be fastened to a fastening groove provided on an inner circumferential surface of the rotating portion; and a sealing unit mounted on the fastening member, and disposed to cover a lower opening of the inner case when the fastening member is fastened to the fastening groove. The guide unit may further include a base disposed in parallel to the rotating shaft, and the vane may be protruded from the base. The guide unit may further include a skirt extended downward in an inclined manner from an upper portion thereof to an outside thereof, and the vane may be protruded from the skirt.

A vacuum cleaner may include a cleaner body; and a dust collector disposed in the cleaner body, wherein the dust collector provided a first cyclone provided within an outer case to filter dust from air introduced from an outside thereof and introduce the air from which dust has been filtered thereinto; a second cyclone accommodated within the first cyclone to separate fine dust from the air introduced into the first cyclone; a guide unit provided at a lower side of the first cyclone to guide foreign matter and dust filtered by the first cyclone in a downward direction; and a pressurizing unit configured to be rotatable in both directions in a first storage section formed below the guide unit, and wherein the pressurizing unit is provided with a roller portion positioned to face a lower side of the outer case, and configured with a plurality of ribs extended in a radial direction at preset intervals. The guide unit may be coupled to the pressurizing unit to rotate along with the pressurizing unit.

A vacuum cleaner may include a cleaner body; and a dust collector provided in the cleaner body, wherein the dust collector includes a first cyclone provided within an outer case to filter dust from air introduced from an outside thereof and introduce the air from which dust has been filtered thereinto; a second cyclone accommodated within the first cyclone to separate fine dust from the air introduced into the first cyclone; and a guide unit provided at a lower side of the first cyclone to guide foreign matter and dust filtered by the first cyclone in a downward direction, and configured to be rotatable in at least one direction with respect to the first cyclone.

The second cyclone may be completely accommodated into the first cyclone to reduce a height of the dust collector. In this arrangement, a guide vane may be provided at an entrance port of the second cyclone to cause rotational flow to the air introduced into the second cyclone, and thus a separate guide passage extended from one side of the second cyclone may be not required, and as a result, it may be possible to arrange more second cyclones within the first cyclone. Therefore, even though the second cyclone is accommodated within the first cyclone, a number of the second cyclones may not be reduced when compared to the related art, thereby preventing the deterioration of the cleaning performance.

Foreign matter and dust filtered by the first cyclone may be guided by a vane of the guide unit provided below the first cyclone, and introduced into the first storage unit under the guide unit. Here, the vane may be spirally formed along a flow direction of the air flowing into the outer case, and at least part of one of vanes may be provided to overlap with another vane in a vertical direction to limit a backflow of foreign matter and dust.

The guide unit (or rotation unit) provided with a skirt at a lower side of the first cyclone may be configured to be rotatable in at least one direction, and thus even though foreign matter is caught in a gap between the skirt and the outer case, the foreign matter may be released by the rotation of the rotating unit. The foreign matter released from the gap may be introduced into the first storage section under the skirt by rotational flow due to the driving of the vacuum cleaner.

At least one of the guide unit (or rotation unit) and the pressurizing unit configured to be rotatable therewith may be provided with a roller portion configured with ribs facing the lower cover, thereby inducing aggregation between foreign matter and dust. When the roller portion is provided on each of the guide unit and the pressurizing unit, and each roller portion is provided at a different height with respect to the lower cover, the roller portion corresponding to an accumulation height of foreign object and dust may be used to induce aggregation between foreign matter and dust. Furthermore, the roller portion may be combined with the driving of the pressurizing unit to perform compression as well as agglomeration between foreign matter and dust.

When the rotating unit rotates with respect to the first cyclone, a scraper provided on a pillar of the rotating unit may be configured to move along the outer circumference of the first cyclone in contact with a mesh filter, and thus it may be possible to continuously remove foreign matter and dust caught and accumulated on the mesh filter when the vacuum cleaner is driven. Therefore, it may be possible to enhance the performance and maintenance convenience of the dust collector.

An upper cover covering the first and second cyclones may be provided with an intake guide and an exhaust guide, and a connection unit may be directly connected to an inlet of the intake guide. According to this, a flow guide provided in the cleaner body in a side inflow structure in the related art may not be required to simplify a suction passage and increase an area of the entrance port when compared to the side inflow structure. Therefore, a pressure loss may be reduced to enhance suction efficiency.

When an intake guide is formed with a single passage, and an exhaust guide is configured with an empty space of the intake guide, an upper cover with a suction efficiency may be provided. Furthermore, there is an advantage that an upper cover can be injection-molded at one time by three molds assembled and separated in three directions at an inlet side of the intake guide, an outlet side of the exhaust guide and a bottom side of the upper cover. Both the first storage section and the second storage section may be open when a lower cover is separated therefrom, it may be possible to discharge dust collected in the first storage section and fine dust collected in the second storage section at the same time.

This application relates to U.S. application Ser. Nos. 15/583,269, 15/583,309, 15/583,394, 15/583,471, and 15/583,478, all filed on May 1, 2017, which are hereby incorporated by reference in their entirety. Further, one of ordinary skill in the art will recognize that features disclosed in these above-noted applications may be combined in any combination with features disclosed herein.

Any reference in this specification to "one embodiment," "an embodiment," "example embodiment," etc., means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A vacuum cleaner, comprising:
   a cleaner body; and
   a dust collector provided in the cleaner body, wherein the dust collector comprises:
      a first cyclone provided by an inner case and an outer case to filter first foreign matter from air introduced into the dust collector;
      a second cyclone having a plurality of hollow bodies in the inner case to separate second foreign matter from the air filtered from the first cyclone; and
      a screw provided at a lower side of the first cyclone, and having at least one vane spirally extended along a flow direction of the air introduced into the outer case to induce an inflow of the first foreign matter filtered by the first cyclone into a first storage chamber.

2. The vacuum cleaner of claim 1, wherein the inner case includes a housing having a mesh filter that filters the first foreign matter from air passing through the mesh filter, and wherein the screw surrounds the first cyclone.

3. The vacuum cleaner of claim 1, wherein the at least one vane protrudes from an outer circumferential surface of the inner case and is provided adjacent to an inner circumferential surface of the outer case.

4. The vacuum cleaner of claim 1, wherein a plurality of the vanes are provided spaced apart from each other at regular intervals along an outer circumference of the screw.

5. The vacuum cleaner of claim 4, wherein at least part of any one of the plurality of vanes overlaps with another vane in a vertical direction of the screw.

6. The vacuum cleaner of claim 1, wherein the screw is configured to be rotatable in at least one direction with respect to the first cyclone.

7. The vacuum cleaner of claim 6, wherein a rib inclined in a crossing direction with respect to the vane protrudes from an inner circumferential surface of the outer case facing the vane.

8. The vacuum cleaner of claim 7, wherein when the vane has a prescribed slope with respect to a rotating shaft of the screw, the rib has a slope opposite to the prescribed slope.

9. The vacuum cleaner of claim 7, wherein the rib is parallel to a rotating shaft of the screw.

10. The vacuum cleaner of claim 7, wherein the rib is inclined along a flow direction of air introduced into the outer case.

11. The vacuum cleaner of claim 1, wherein a discharge port of the second cyclone passes through a bottom surface of the first cyclone, and the inner case is provided at a lower portion of the first cyclone to form a second storage chamber to collect the second foreign matter discharged through the discharge port.

12. The vacuum cleaner of claim 11, wherein the dust collector further includes a compactor configured to be rotatable in first and second directions in the first storage chamber so as to compact the first foreign matter collected in the first storage chamber formed below the screw to reduce a volume thereof, and the screw is coupled to the compactor to rotate along with the compactor.

13. The vacuum cleaner of claim 12, wherein the compactor includes:
   a shaft surrounding at least part of the inner case, and configured to be relatively rotatable with respect to the inner case; and
   a blade that protrudes from the shaft in a radial direction.

14. The vacuum cleaner of claim 13, wherein at least one of the screw and the compactor includes a cuff having an edge facing a lower side of the outer case, and configured with a plurality of ribs extended in respective radial directions at predetermined intervals between the cuff and the shaft.

15. The vacuum cleaner of claim 13, wherein the dust collector further includes a lower cover hinge-coupled to the outer case to form a bottom surface of the first storage chamber and the second storage chamber, and configured to open the first storage chamber and the second storage chamber at the same time while relatively rotating with respect to the outer case by a hinge.

16. The vacuum cleaner of claim 15, wherein the lower cover includes:

a gearing configured to rotate by receiving a driving force from a drive motor provided in the cleaner body, and having a first gear configured to engage with a fastening groove provided on an inner circumferential surface of the shaft; and a seal cap mounted on the first gear, and arranged to cover a lower opening of the inner case when the first gear is fastened to the fastening groove.

17. The vacuum cleaner of claim 1, wherein the screw further includes a base parallel to the rotating shaft, and the vane protrudes from the base.

18. The vacuum cleaner of claim 1, wherein the screw further includes a skirt extended downward and outward from an upper portion of the screw, and the vane protrudes from the skirt.

19. A vacuum cleaner, comprising:
a cleaner body; and
a dust collector provided in the cleaner body, wherein the dust collector includes:
   a first cyclone provided by an inner case and an outer case to filter first foreign matter from air introduced into the dust collector;
   a second cyclone having a plurality of hollow bodies in the inner case to separate second foreign matter from the air filtered from the first cyclone;
   a screw provided at a lower side of the first cyclone to guide the first foreign matter filtered by the first cyclone in a downward direction; and
   a compactor configured to be rotatable in first and second directions in a first storage chamber formed below the screw, wherein the compactor includes a cuff having an edge facing a lower side of the outer case, and configured with a plurality of ribs extending in a radial direction at predetermined intervals between the cuff and the compactor.

20. The vacuum cleaner of claim 19, wherein the screw is coupled to the compactor to rotate along with the compactor.

21. A vacuum cleaner, comprising:
a cleaner body; and
a dust collector provided in the cleaner body, wherein the dust collector includes:
   a first cyclone provided by an inner case and an outer case to filter first foreign matter from air introduced into the dust collector;
   a second cyclone having a plurality of hollow bodies in the inner case to separate second foreign matter from the air filtered from the first cyclone; and
   a screw provided at a lower side of the first cyclone to guide the first foreign matter filtered by the first cyclone in a downward direction, and configured to be rotatable in at least one direction with respect to the first cyclone.

\* \* \* \* \*